(12) United States Patent
Moore

(10) Patent No.: US 8,316,005 B2
(45) Date of Patent: Nov. 20, 2012

(54) NETWORK-ACCESSIBLE DATABASE OF REMOTE SERVICES

(75) Inventor: James F. Moore, Lincoln, MA (US)

(73) Assignee: Newslike Media Group, Inc, Lincoln, MA (US)

(*) Notice: Subject to any disclaimer, the term of this patent is extended or adjusted under 35 U.S.C. 154(b) by 445 days.

(21) Appl. No.: 11/608,261

(22) Filed: Dec. 8, 2006

(65) Prior Publication Data

US 2007/0081550 A1 Apr. 12, 2007

Related U.S. Application Data

(63) Continuation of application No. 11/458,092, filed on Jul. 17, 2006, which is a continuation-in-part of application No. 11/380,923, filed on Apr. 29, 2006, which is a continuation-in-part of application No. 11/223,826, filed on Sep. 10, 2005, and a continuation-in-part of application No. 11/346,588, filed on Feb. 1, 2006, and a continuation-in-part of application No. 11/346,586, filed on Feb. 1, 2006, and a continuation-in-part of application No. 11/346,587, filed on Feb. 1, 2006.

(60) Provisional application No. 60/649,311, filed on Feb. 1, 2005, provisional application No. 60/649,312, filed on Feb. 1, 2005, provisional application No. 60/649,504, filed on Feb. 2, 2005, provisional application No. 60/649,502, filed on Feb. 2, 2005, provisional application No. 60/657,840, filed on Mar. 1, 2005, provisional application No. 60/594,298, filed on Mar. 26, 2005, provisional application No. 60/594,416, filed on Apr. 6, 2005, provisional application No. 60/669,666, filed on Apr. 8, 2005, provisional application No. 60/594,456, filed on Apr.

(Continued)

(51) Int. Cl.
*G06F 17/30* (2006.01)
(52) U.S. Cl. .................. 707/707; 707/795; 707/796
(58) Field of Classification Search .................. 707/707, 707/795, 796
See application file for complete search history.

(56) References Cited

U.S. PATENT DOCUMENTS 5,664,109 A 9/1997 Johnson et al.
(Continued)

FOREIGN PATENT DOCUMENTS

DD 226868 9/1984
(Continued)

OTHER PUBLICATIONS

RDF Primer, Feb. 10, 2004, pp. 93-94.*
(Continued)

*Primary Examiner* — Rehana Perveen
*Assistant Examiner* — Albert Phillips, III
(74) *Attorney, Agent, or Firm* — GTC Law Group LLP & Affiliates

(57) ABSTRACT

The systems, methods, means, and computer program products disclosed herein provide a framework and tools for creating composite services from the array of services available as distributed, loosely structured, ad hoc, remote programming interfaces on the Internet. The framework includes metaservices for coordinating the execution of multiple services in a composite service, and also provides core services such as database management, security, financial transactions, media conversion, and so forth, to provide greater design latitude in the creation of new composite services from existing Internet content and services. The framework may be deployed to create new services and programming interfaces, or to deploy independent web applications constructed from available services.

18 Claims, 12 Drawing Sheets

Related U.S. Application Data 10, 2005, provisional application No. 60/594,478, filed on Apr. 12, 2005, provisional application No. 60/673,661, filed on Apr. 20, 2005, provisional application No. 60/680,879, filed on May 13, 2005, provisional application No. 60/684,092, filed on May 23, 2005, provisional application No. 60/685,904, filed on May 31, 2005, provisional application No. 60/686,630, filed on Jun. 2, 2005, provisional application No. 60/688,826, filed on Jun. 9, 2005, provisional application No. 60/694,080, filed on Jun. 24, 2005, provisional application No. 60/695,029, filed on Jun. 28, 2005, provisional application No. 60/699,631, filed on Jul. 15, 2005, provisional application No. 60/700,122, filed on Jul. 18, 2005, provisional application No. 60/702,467, filed on Jul. 26, 2005, provisional application No. 60/703,688, filed on Jul. 29, 2005, provisional application No. 60/703,535, filed on Jul. 29, 2005, provisional application No. 60/703,544, filed on Jul. 29, 2005, provisional application No. 60/709,683, filed on Aug. 19, 2005, provisional application No. 60/719,073, filed on Sep. 21, 2005, provisional application No. 60/719,283, filed on Sep. 21, 2005, provisional application No. 60/719,284, filed on Sep. 21, 2005, provisional application No. 60/720,250, filed on Sep. 22, 2005, provisional application No. 60/721,803, filed on Sep. 28, 2005, provisional application No. 60/722,021, filed on Sep. 29, 2005, provisional application No. 60/724,956, filed on Oct. 7, 2005, provisional application No. 60/725,166, filed on Oct. 7, 2005, provisional application No. 60/726,542, filed on Oct. 14, 2005, provisional application No. 60/726,731, filed on Oct. 14, 2005, provisional application No. 60/726,727, filed on Oct. 14, 2005, provisional application No. 60/734,187, filed on Nov. 6, 2005, provisional application No. 60/734,156, filed on Nov. 6, 2005, provisional application No. 60/735,712, filed on Nov. 11, 2005, provisional application No. 60/741,770, filed on Dec. 1, 2005, provisional application No. 60/741,958, filed on Dec. 2, 2005, provisional application No. 60/742,975, filed on Dec. 6, 2005, provisional application No. 60/749,757, filed on Dec. 13, 2005, provisional application No. 60/750,291, filed on Dec. 14, 2005, provisional application No. 60/751,254, filed on Dec. 15, 2005, provisional application No. 60/751,249, filed on Dec. 16, 2005, provisional application No. 60/753,959, filed on Dec. 23, 2005, provisional application No. 60/756,774, filed on Jan. 6, 2006, provisional application No. 60/759,483, filed on Jan. 16, 2006, provisional application No. 60/764,484, filed on Feb. 1, 2006, provisional application No. 60/777,444, filed on Feb. 27, 2006, provisional application No. 60/784,906, filed on Mar. 21, 2006, provisional application No. 60/788,011, filed on Mar. 31, 2006, provisional application No. 60/747,425, filed on May 17, 2006.

(56) References Cited

U.S. PATENT DOCUMENTS

| | | | |
|---|---|---|---|
| 5,758,095 A | 5/1998 | Albaum et al. | |
| 5,784,635 A | 7/1998 | McCallum | |
| 5,845,255 A | 12/1998 | Mayaud | |
| 5,930,764 A | 7/1999 | Melchione et al. | 705/10 |
| 5,931,946 A | 8/1999 | Terada et al. | |
| 5,933,136 A | 8/1999 | Brown | |
| 6,022,315 A | 2/2000 | Iliff | |
| 6,070,189 A | 5/2000 | Bender et al. | |
| 6,131,085 A | 10/2000 | Rossides | |
| 6,199,082 B1 | 3/2001 | Ferrel et al. | |
| 6,233,618 B1 | 5/2001 | Shannon | |
| 6,253,210 B1 | 6/2001 | Smith et al. | |
| 6,311,194 B1 | 10/2001 | Sheth et al. | |
| 6,442,333 B1 | 8/2002 | Izawa | |
| 6,551,243 B2 | 4/2003 | Bocionek et al. | |
| 6,598,161 B1 | 7/2003 | Kluttz et al. | |
| 6,678,764 B2 | 1/2004 | Parvulescu et al. | |
| 6,693,947 B1 | 2/2004 | Schroeder | |
| 6,734,886 B1 | 5/2004 | Hagan et al. | |
| 6,904,461 B1 | 6/2005 | Randhava et al. | |
| 6,931,532 B1 | 8/2005 | Davis et al. | |
| 6,954,532 B1 | 10/2005 | Handley et al. | |
| 6,993,522 B2 | 1/2006 | Chen et al. | |
| 7,010,681 B1 | 3/2006 | Fletcher et al. | |
| 7,058,710 B2 | 6/2006 | McCall et al. | 709/224 |
| 7,072,934 B2 | 7/2006 | Helgeson et al. | |
| 7,117,504 B2 | 10/2006 | Smith et al. | |
| 7,127,328 B2 | 10/2006 | Ransom | |
| 7,142,691 B2 | 11/2006 | Levy | |
| 7,146,415 B1 | 12/2006 | Doi et al. | |
| 7,149,813 B2 | 12/2006 | Flanagin et al. | |
| 7,188,144 B2 | 3/2007 | Fuisz | 709/206 |
| 7,269,664 B2 | 9/2007 | Hütsch et al. | |
| 7,296,077 B2 | 11/2007 | Harmon et al. | |
| 7,308,477 B1 | 12/2007 | Gress et al. | |
| 7,406,427 B1 | 7/2008 | Guyan et al. | |
| 7,412,534 B2 | 8/2008 | Tsang et al. | |
| 7,421,155 B2 | 9/2008 | King | |
| 7,451,147 B1 | 11/2008 | Kao et al. | |
| 7,472,349 B1 | 12/2008 | Srivastava et al. | |
| 7,519,591 B2 | 4/2009 | Landi et al. | |
| 7,565,410 B2 | 7/2009 | Stickler | |
| 7,584,208 B2 | 9/2009 | Spivack et al. | |
| 7,904,367 B2 | 3/2011 | Chung et al. | |
| 7,949,666 B2 | 5/2011 | Wolff et al. | |
| 7,953,725 B2 | 5/2011 | Burris et al. | |
| 8,010,282 B2 | 8/2011 | Barry et al. | |
| 8,140,482 B2 | 3/2012 | Moore | |
| 8,200,700 B2 | 6/2012 | Moore et al. | |
| 8,200,775 B2 | 6/2012 | Moore | |
| 2001/0016851 A1 | 8/2001 | Gramsamer et al. | |
| 2001/0051881 A1 | 12/2001 | Filler | |
| 2001/0052933 A1 | 12/2001 | Nybo et al. | |
| 2001/0056359 A1 | 12/2001 | Abreu | |
| 2002/0010616 A1 | 1/2002 | Itzhaki | |
| 2002/0010764 A1 | 1/2002 | Spicer | |
| 2002/0029157 A1 | 3/2002 | Marchosky | |
| 2002/0032742 A1 | 3/2002 | Anderson | |
| 2002/0038316 A1 | 3/2002 | Onyon et al. | |
| 2002/0049613 A1 | 4/2002 | Schmieding | |
| 2002/0049614 A1 | 4/2002 | Rice | |
| 2002/0059049 A1 | 5/2002 | Bradbury et al. | |
| 2002/0059399 A1 | 5/2002 | Learmonth | |
| 2002/0138467 A1 | 9/2002 | Jacobson et al. | |
| 2002/0143742 A1 | 10/2002 | Nonomura et al. | |
| 2002/0143819 A1 | 10/2002 | Han et al. | |
| 2002/0152210 A1* | 10/2002 | Johnson et al. | 707/9 |
| 2002/0152318 A1 | 10/2002 | Menon et al. | |
| 2002/0154178 A1 | 10/2002 | Barnett et al. | |
| 2002/0188522 A1 | 12/2002 | McCall et al. | |
| 2003/0046434 A1 | 3/2003 | Flanagin et al. | |
| 2003/0050801 A1 | 3/2003 | Ries et al. | |
| 2003/0055818 A1 | 3/2003 | Faybishenko et al. | |
| 2003/0055825 A1 | 3/2003 | Chen et al. | |
| 2003/0061404 A1 | 3/2003 | Atwal et al. | |
| 2003/0069751 A1 | 4/2003 | Lichtenstein et al. | |
| 2003/0074352 A1 | 4/2003 | Raboczi et al. | |
| 2003/0088544 A1 | 5/2003 | Kan et al. | |
| 2003/0126120 A1 | 7/2003 | Faybishenko et al. | |
| 2003/0217047 A1 | 11/2003 | Marchisio | |
| 2003/0225718 A1 | 12/2003 | Shmulevich et al. | |
| 2003/0229692 A1 | 12/2003 | Vo | |

| | | |
|---|---|---|
| 2004/0002966 A1 | 1/2004 | Perkowski |
| 2004/0034550 A1 | 2/2004 | Menschik et al. |
| 2004/0054675 A1 | 3/2004 | Li |
| 2004/0054722 A1 | 3/2004 | DeFloor et al. .............. 709/203 |
| 2004/0064428 A1* | 4/2004 | Larkin et al. ................... 707/1 |
| 2004/0073661 A1 | 4/2004 | Eibach et al. |
| 2004/0078231 A1 | 4/2004 | Wilkes et al. |
| 2004/0078236 A1 | 4/2004 | Stoodley et al. |
| 2004/0093412 A1 | 5/2004 | Chen et al. |
| 2004/0133580 A1 | 7/2004 | Liu et al. |
| 2004/0139317 A1 | 7/2004 | Fronberg |
| 2004/0139327 A1 | 7/2004 | Brown et al. |
| 2004/0143623 A1 | 7/2004 | Fukui et al. |
| 2004/0172423 A1 | 9/2004 | Kaasten et al. |
| 2004/0181679 A1 | 9/2004 | Dettinger et al. |
| 2004/0207659 A1 | 10/2004 | Goodman et al. |
| 2004/0221226 A1 | 11/2004 | Lin et al. |
| 2004/0224674 A1 | 11/2004 | O'Farrell et al. |
| 2004/0230674 A1 | 11/2004 | Pourheidari et al. |
| 2004/0254816 A1 | 12/2004 | Myers |
| 2004/0260767 A1 | 12/2004 | Kedem et al. |
| 2004/0267610 A1 | 12/2004 | Gossett et al. |
| 2005/0027567 A1 | 2/2005 | Taha |
| 2005/0027871 A1 | 2/2005 | Bradley et al. .............. 709/227 |
| 2005/0038717 A1 | 2/2005 | McQueen III, et al. |
| 2005/0055308 A1 | 3/2005 | Meyer et al. |
| 2005/0108057 A1 | 5/2005 | Cohen et al. |
| 2005/0120300 A1 | 6/2005 | Schwager et al. |
| 2005/0132048 A1 | 6/2005 | Kogan et al. |
| 2005/0160065 A1 | 7/2005 | Seeman |
| 2005/0165615 A1 | 7/2005 | Minar |
| 2005/0198021 A1 | 9/2005 | Wilcox et al. |
| 2005/0216315 A1 | 9/2005 | Andersson |
| 2005/0234740 A1 | 10/2005 | Krishnan et al. |
| 2005/0262340 A1 | 11/2005 | Rabb |
| 2005/0267973 A1 | 12/2005 | Carlson et al. |
| 2005/0289468 A1 | 12/2005 | Kahn et al. |
| 2006/0004691 A1 | 1/2006 | Sifry |
| 2006/0004764 A1* | 1/2006 | Kurhekar et al. ............... 707/10 |
| 2006/0010251 A1 | 1/2006 | Mrsic-flogel et al. |
| 2006/0053156 A1 | 3/2006 | Kaushansky et al. |
| 2006/0059208 A1 | 3/2006 | Chen et al. |
| 2006/0064320 A1 | 3/2006 | Postrel |
| 2006/0064326 A1 | 3/2006 | Tucker |
| 2006/0073812 A1 | 4/2006 | Punaganti et al. |
| 2006/0074980 A1 | 4/2006 | Sarkar |
| 2006/0075426 A1 | 4/2006 | Koch et al. |
| 2006/0080166 A1 | 4/2006 | Takahashi |
| 2006/0085412 A1 | 4/2006 | Johnson et al. |
| 2006/0085788 A1 | 4/2006 | Amir et al. |
| 2006/0095507 A1 | 5/2006 | Watson |
| 2006/0095628 A1 | 5/2006 | Ludwig et al. |
| 2006/0101035 A1 | 5/2006 | Mustakallio et al. |
| 2006/0106655 A1 | 5/2006 | Lettovsky et al. |
| 2006/0106748 A1 | 5/2006 | Chafle et al. |
| 2006/0111938 A1 | 5/2006 | Vitiello |
| 2006/0112076 A1 | 5/2006 | Burris et al. |
| 2006/0136259 A1 | 6/2006 | Weiner et al. |
| 2006/0149591 A1 | 7/2006 | Hanf et al. |
| 2006/0155698 A1 | 7/2006 | Vayssiere |
| 2006/0167860 A1 | 7/2006 | Eliashberg et al. |
| 2006/0173985 A1 | 8/2006 | Moore |
| 2006/0178910 A1 | 8/2006 | Eisenberger et al. |
| 2006/0178918 A1 | 8/2006 | Mikurak |
| 2006/0184617 A1 | 8/2006 | Nicholas et al. |
| 2006/0188327 A1 | 8/2006 | Moon |
| 2006/0200380 A1 | 9/2006 | Ho et al. |
| 2006/0200478 A1 | 9/2006 | Pasztor et al. |
| 2006/0221076 A1 | 10/2006 | Takahashi et al. |
| 2006/0229911 A1 | 10/2006 | Gropper et al. |
| 2006/0230011 A1 | 10/2006 | Tuttle et al. |
| 2006/0230021 A1 | 10/2006 | Diab et al. |
| 2006/0230221 A1 | 10/2006 | Hsu et al. |
| 2006/0247961 A1 | 11/2006 | Klemow |
| 2006/0265489 A1 | 11/2006 | Moore |
| 2006/0265508 A1 | 11/2006 | Angel et al. |
| 2006/0288011 A1 | 12/2006 | Gandhi et al. |
| 2006/0288329 A1 | 12/2006 | Gandhi et al. |
| 2007/0011665 A1 | 1/2007 | Gandhi et al. |
| 2007/0011710 A1 | 1/2007 | Chiu |
| 2007/0027710 A1 | 2/2007 | Mohr |
| 2007/0038712 A1 | 2/2007 | Affronti et al. |
| 2007/0050446 A1 | 3/2007 | Moore |
| 2007/0061266 A1 | 3/2007 | Moore et al. |
| 2007/0061393 A1 | 3/2007 | Moore et al. |
| 2007/0061487 A1 | 3/2007 | Moore et al. |
| 2007/0073934 A1 | 3/2007 | Rogers |
| 2007/0079237 A1 | 4/2007 | Abrams et al. |
| 2007/0081550 A1 | 4/2007 | Moore |
| 2007/0088807 A1 | 4/2007 | Moore |
| 2007/0094156 A1 | 4/2007 | Isaacs |
| 2007/0094350 A1 | 4/2007 | Moore |
| 2007/0094365 A1 | 4/2007 | Nussey et al. |
| 2007/0094389 A1 | 4/2007 | Nussey et al. |
| 2007/0100959 A1 | 5/2007 | Eichstaedt et al. |
| 2007/0106536 A1 | 5/2007 | Moore |
| 2007/0106537 A1 | 5/2007 | Moore |
| 2007/0106649 A1 | 5/2007 | Moore |
| 2007/0106650 A1 | 5/2007 | Moore |
| 2007/0106750 A1 | 5/2007 | Moore |
| 2007/0106751 A1 | 5/2007 | Moore |
| 2007/0106752 A1 | 5/2007 | Moore |
| 2007/0106753 A1 | 5/2007 | Moore |
| 2007/0106754 A1 | 5/2007 | Moore |
| 2007/0116036 A1 | 5/2007 | Moore |
| 2007/0116037 A1 | 5/2007 | Moore |
| 2007/0130457 A1 | 6/2007 | Kamat et al. |
| 2007/0139182 A1 | 6/2007 | O'Connor et al. |
| 2007/0143215 A1 | 6/2007 | Willems |
| 2007/0150482 A1 | 6/2007 | Taylor et al. |
| 2007/0156809 A1 | 7/2007 | Dickinson et al. |
| 2007/0168461 A1 | 7/2007 | Moore |
| 2007/0207782 A1 | 9/2007 | Tran |
| 2007/0220016 A1 | 9/2007 | Estrada et al. |
| 2007/0225047 A1 | 9/2007 | Bakos |
| 2007/0245020 A1 | 10/2007 | Ott et al. |
| 2008/0005086 A1 | 1/2008 | Moore |
| 2008/0040151 A1 | 2/2008 | Moore |
| 2008/0046369 A1 | 2/2008 | Wood |
| 2008/0046437 A1 | 2/2008 | Wood |
| 2008/0046471 A1 | 2/2008 | Moore et al. |
| 2008/0052162 A1 | 2/2008 | Wood |
| 2008/0052343 A1 | 2/2008 | Wood |
| 2008/0126178 A1 | 5/2008 | Moore |
| 2008/0126476 A1 | 5/2008 | Nicholas et al. |
| 2008/0141126 A1 | 6/2008 | Johnson et al. |
| 2008/0195483 A1 | 8/2008 | Moore |
| 2008/0244091 A1 | 10/2008 | Moore et al. |
| 2009/0172773 A1 | 7/2009 | Moore |

FOREIGN PATENT DOCUMENTS

| | | |
|---|---|---|
| DE | 4434369 | 3/1996 |
| EP | 0504774 | 9/1992 |
| GB | 901723 | 7/1962 |
| JP | 06347169 | 12/1994 |
| JP | 09145249 | 6/1997 |
| WO | WO-8304161 A1 | 12/1983 |
| WO | WO-03077558 A2 | 9/2003 |
| WO | WO-2004015742 A2 | 2/2004 |
| WO | WO-2006083958 A2 | 8/2006 |
| WO | WO-2007011917 A2 | 1/2007 |
| WO | WO-2007130865 A2 | 11/2007 |
| WO | WO-2007137145 A2 | 11/2007 |
| WO | WO-2008036464 A2 | 3/2008 |

OTHER PUBLICATIONS

Winer, OPML About Page, Nov. 7, 2000, p. 1.*
UDDI Version 2.04 API Specification, Jul. 19, 2002, p. 6.*
Ponnekanti, SWORD: A Developer Toolkit for Web Service Composition, 2002, pp. 1-25.*
Stal, Web Services: Beyond Component Based Computing Seeking a Better Solution to the Application Integration Problem, Communications of the ACM, vol. 45, No. 10, Oct. 2002, pp. 71-76.*
Roszkowski and Lukas, A Distributed Architecture for Resource Discovery Using Metadata, D-Lib Magazine Jun. 1998, pp. 1-11.*
Refsnes Data, W3Schools Online Web Tutorials, 2002. pp. 1-6.*

Notification of Transmittal of the International Search Report and the Written Opinion of the International Searching Authority, or the Declaration, PCT/US06/27794, 14 pages, Nov. 26, 2007.
Notification of Transmittal of the International Search Report and the Written Opinion of the International Searching Authority, or the Declaration, PCT/US07/67643, 11 pages, Jun. 20, 2008.
Notification of Transmittal of the International Search Report and the Written Opinion of the International Searching Authority, or the Declaration, PCT/US07/74475, 9 pages, Jun. 30, 2008.
Wood, Charlie "Introducing Spanning Feed Builder for AppExchange", http://www.spanningpartners.com/2006/07/introducing_spa.html, (Jul. 2, 2006).
Wood, Charlie "Blog of Subscribe Your Calendar to Your Salesforce.com Events", http://globelogger.com/item.php?id=660, (May 12, 2006).
Gawlick, Dieter et al., "Using the Oracle Database as a Declarative RSS Hub", *International Conference on Management of Data*, Proceedings of the 2006 ACM SIGMOD international conference on Management of data,(2006),722.
USPTO, "U.S. Appl. No. 11/458,092, Non-Final Office Action mailed Jun. 9, 2008", OARN,23 pgs.
Appnel, T. "RSS: The Web Services We Already Have", (Jan. 22, 2003).
Maurer, L. "U.S. Appl. No. 09/584,318 (Appendix)".
USPTO, ""U.S. Appl. No. 11/615,030 Non Final Office Action mailed Jan. 23, 2008"", (Jan. 23, 2008),all.
Wood, Charlie "Subscribe Your Calendar to Your Salesforce.com Events", http://www.spanningpartners.com/2006/05/subscribe_your_.html, (May 12, 2006).
Wood, Charlie "RSS-Enabled AppExchange Applications", http://www.spanningpartners.com/2006/05/spanning_partne_1.html, (May 30, 2006).
Wood, Charlie "Latest Spanning Salesforce Release", http://www.spanningpartners.com/2006/04/latest_spanning.html, (Apr. 5, 2006).
Wood, Charlie "New Spanning Salesforce Feeds and Features", http://globelogger.com/item.php?id=606, (Mar. 14, 2006).
Wood, Charlie "On Creating Real Business Value with RSS", http://www.spanningpartners.com/2006/02/on_creating_rea.html, (Feb. 23, 2006).
Wood, Charlie "Spanning Salesforce 2.0 is Live", http://globelogger.com/item.php?id=466, (Aug. 28, 2005).
Wood, Charlie "Introducing Spanning Salesforce 2.0", http://www.spanningpartners.com/2005/08/introducing_spa.html, (Aug. 28, 2005).
Wood, Charlie "Adoption Using RSS to Track Sales Leads", http://globelogger.com/item.php?id=285, (Jan. 28, 2005).
Wood, Charlie "Adoption Salesforce.com via RSS", http://globelogger.com/item.php?id=294, (Feb. 6, 2005).
Wood, Charlie "Spanning Salesforce Goes Public", http://globelogger.com/item.php?id=285, (Jul. 17, 2005).
Krill, Paul "Microsoft to demo CRM-RSS", http://weblog.infoworld.com/techwatch/archives/003933.html, (Sep. 7, 2005).
"Customer", *Roget's II The New Thesaurus*. Boston: Houghton Mifflin Credo Reference. [online][retrieved on Jul. 10, 2011], 2003.
"Serve", *Chambers 21st Century Dictionary*. London: Chambers Harrap Credo Reference [online][retrieved on Jul. 10, 2011], 2001.
"Service", *Chambers 21st Century Dictionary*. London: Chambers Harrap. Credo Reference. [online][retrieved on Jul. 10, 2011], 2011.
"Definition Metadata", Webster's New World Computer Dictionary, 2003.
"Definition: Dicom introduction", http://www.cabiati.comimricroldicomlindex.html , 10 pages.
"Digital Imaging and Communications (DICOM) part 10", PS Mar. 10, 2004, National Electronics Manufactures Association, Rosslyn, Virgina, 2004, 33 pages.
"Drugs and Herbs", http://web.archive.orcilweb/20051101101459/http://www.webmd.com/dru gs/index-drugs.aspx (accessed online Jul. 11, 2011), 45 pages.
"OPML 1.0 Specification", http://www.opml.org/spec, 2000, (accessed online Jul. 5, 2011), 6 pages.
"RDF Primer", W3C Recommendation, http://www.w3.org/Tr/rdf-syntax/ , 2004, (accessed online Jul. 5, 2011), 73 pages.

"Urchin RSS Aggregator", http://urchin.sourceforge.net/index.html , version 0.92, 2004, (accessed online Jun. 2, 2009), pp. 1-5.
Lund, Ben, "Using Urchin, Notes for Webmasters", Urchin version 0.8, 2003, 8 pages.
Fema, "FEMA: Federal Disaster Declarations RSS"FEMA.gov,. http://web.archive.org/web/20050413031904/http://fema.gov/news . . . (accessed online Dec. 29, 2010), 1 page.
FEMA, "FEMA: News Releases", feed://web.archive.org/web/20050403173625/www.fema.gov/news/recentnews_rss.fema , (access online Jul. 5, 2011), Apr. 3, 2005, 2 pages.
Fema, "RSS," http://www.fema.gov/help/rss.shtm , Apr. 16, 2005, 2 pages.
Hammond, Tony et al., "The Role of RSS in Science Publishing", D-LibMagazine, vol. 10, No. 12, Dec. 2004, pp. 1-17.
Kifer, Michael, et al., Database Systems: An Application-Oriented Approach, Second Edition, Boston, MA: Pearson Education Inc., 2005, pp. 1151-1152.
Lewin, James, "An Introduction to RSS news feeds Using open formats For content syndication", http://www.opensourcetutorials.com/tutorials/Server-Side-Coding/Perl/perl/-rss-news-feed/page1.html, (accessed online Jul. 5, 2011), 2000, 11 pages.
Marshall, James, "HTTP Made Really Easy", A Practical Guide to Writing Clients and Servers, http:www.jmarshall.com/easy/http/, (accessed online Jul. 12, 2011), 1997, 21 pages.
Nakano, Yusuke, et al., "A proposal of RSS WebCrawler model of product information", Active Media Technology, Proceedings of the 2005 International Conference on Active Media Technology, pp. 147-151, (2005).
International Application Serial No. PCT/US06/27794, International Preliminary Report on Patentability, 7 pages.
International Application Serial No. PCT/US06/27794, International Search Report, 5 pages.
International Application Serial No. PCT/US06/27794, Written Opinion of the International Searching Authority, 6 pages.
International Application Serial No. PCT/US07/069195, International Preliminary Report on Patentability, 6 pages.
International Application Serial No. PCT/US07/069195, Written Opinion of the International Searching Authority, 5 pages.
International Application Serial No. PCT/US07/67643, International Preliminary Report on Patentability, 6 pages.
International Application Serial No. PCT/US07/67643, International Search Report, PCT/US07/67643, 2 pages.
International Application Serial No. PCT/US07/67643, Written Opinion of the International Searching Authority, 5 pages.
International Application Serial No. PCT/US07/74475, International Preliminary Report on Patentability, 4 pages.
International Application Serial No. PCT/US07/74475 International Search Report, 3 pages.
International Application Serial No. PCT/US07/74475, Written Opinion of the International Searching Authority, 3 pages.
International Application Serial No. PCT/US2006/003544, International Preliminary Report on Patentability mailed SEP. 7, 2008, 7 pages.
International Application Serial No. PCT/US2006/003544, Written Opinion mailed SEP. 17, 2008, 6 pages.
International Application Serial No. PCT/US2006/034944, International Preliminary Report on Patentability mailed Mar. 11, 2008, 8 pages.
International Application Serial No. PCT/US2006/034944, Written Opinion mailed Mar. 9, 2008, 7 pages.
International Application Serial No. PCT/US2006/034944, International Search Report mailed Mar. 19, 2007, 7 pages.
Pilgrim, Mark, "How to consume RSS safely", http://diveintomark.org/archives/2003/06/12/how_to_consume_rss safely, 2003.(accessed Jul. 5, 2011), 28 pages.
Schneier, Bruce, Applied Cryptography: Protocols, Algorithms, and Souce Code in C, John Wiley & Sons, Inc., Second Edition, 1996, pp. 584-587.
International Application Serial No. PCT/US07/069195, International Search Report, PCT/US07/069195, 4 pages.
International Application Serial No. PCT/US2006/003544, International Search Report mailed Sep. 17, 2008, 4 pages.

* cited by examiner

NETWORK-ACCESSIBLE DATABASE OF REMOTE SERVICES

RELATED APPLICATIONS

This application is a continuation of U.S. application Ser. No. 11/458,092, which is a continuation-in-part of the following commonly owned U.S. Patent Applications, each of which is hereby incorporated by reference in its entirety:

Ser. No. 11/223,826, filed on Sep. 10, 2005, and entitled ENHANCED SYNDICATION.

Ser. No. 11/346,588, filed on Feb. 1, 2006 and entitled SYSTEMS AND METHODS FOR USE OF STRUCTURED AND UNSTRUCTURED DISTRIBUTED DATA.

Ser. No. 11/346,586, filed on Feb. 1, 2006 and entitled SECURITY SYSTEMS AND METHODS FOR USE WITH STRUCTURED AND UNSTRUCTURED DATA.

Ser. No. 11/346,587, filed on Feb. 1, 2006 and entitled MANAGEMENT OF HEALTH CARE DATA.

This application also claims the benefit of the following commonly owned U.S. Provisional Applications, each of which is hereby incorporated by reference in its entirety:

Ser. No. 60/649,311, filed on Feb. 1, 2005, and entitled DATA STREAM MANAGEMENT.

Ser. No. 60/649,312, filed on Feb. 1, 2005, and entitled DATA STREAM MANAGEMENT SOFTWARE.

Ser. No. 60/649,504, filed on Feb. 2, 2005, and entitled RSS MEDIA PROCESSING SYSTEMS.

Ser. No. 60/649,502, filed on Feb. 2, 2005, and entitled PROCESSING.

Ser. No. 60/657,840, filed on Mar. 1, 2005, and entitled USER INTERFACES AND WORKFLOWS FOR USE WITH DATA STREAM MANAGEMENT SYSTEMS.

Ser. No. 60/594,298, filed on Mar. 26, 2005, and entitled USES OF METADATA IN A STRUCTURED DATA FEED ENVIRONMENT.

Ser. No. 60/594,416, filed on Apr. 6, 2005, and entitled DATA STREAM MANAGEMENT.

Ser. No. 60/669,666, filed on Apr. 8, 2005, and entitled DATA STREAM MANAGEMENT.

Ser. No. 60/594,456, filed on Apr. 10, 2005, and entitled FUNCTIONAL SEARCH OUTLINES.

Ser. No. 60/594,478, filed on Apr. 12, 2005, and entitled DATA STREAM MANAGEMENT.

Ser. No. 60/673,661, filed on Apr. 20, 2005, and entitled DATA STREAM MANAGEMENT.

Ser. No. 60/680,879, filed on May 13, 2005, and entitled DATA STREAM SECURITY SYSTEMS.

Ser. No. 60/684,092, filed on May 23, 2005, and entitled FUNCTIONAL SEARCH OUTLINES.

Ser. No. 60/685,904, filed on May 31, 2005, and entitled WIRELESS DELIVERY OF RSS CONTENT.

Ser. No. 60/686,630, filed on Jun. 2, 2005, and entitled DATA STREAM ADVERTISING.

Ser. No. 60/688,826, filed on Jun. 9, 2005, and entitled USES OF OUTLINES AND STRUCTURED DATA.

Ser. No. 60/694,080, filed on Jun. 24, 2005, and entitled USES OF LISTS, OUTLINES AND STRUCTURED DATA.

Ser. No. 60/695,029, filed on Jun. 28, 2005, and entitled EVALUATION OF DATA FEED CONTENT.

Ser. No. 60/699,631, filed on Jul. 15, 2005, and entitled OPML SEARCH ENGINES AND SUPERSERVICES.

Ser. No. 60/700,122, filed on Jul. 18, 2005, and entitled WEB SUPERSERVICES.

Ser. No. 60/702,467, filed on Jul. 26, 2005, and entitled VERTICAL MARKETS AND FEATURES FOR ENHANCED WEB SYSTEMS.

Ser. No. 60/703,688, filed on Jul. 29, 2005, and entitled OPML SYSTEMS.

Ser. No. 60/703,535, filed on Jul. 29, 2005, and entitled OPML CONVERTER.

Ser. No. 60/703,544, filed on Jul. 29, 2005, and entitled OPML SEARCH ENGINE.

Ser. No. 60/709,683, filed on Aug. 19, 2005, and entitled USER INTERFACES FOR OPML SEARCH ENGINES.

Ser. No. 60/719,073, filed on Sep. 21, 2005, and entitled WEB SUPERSERVICES.

Ser. No. 60/719,283, filed on Sep. 21, 2005, and entitled HEALTH CARE INFORMATION MANAGEMENT.

Ser. No. 60/719,284, filed on Sep. 21, 2005, and entitled OPML ROUTERS.

Ser. No. 60/720,250, filed on Sep. 22, 2005, and entitled BEHAVIORAL METADATA IN SYNDICATION AND STRUCTURED DATA ENVIRONMENTS.

Ser. No. 60/721,803, filed on Sep. 28, 2005, and entitled WEB SUPERSERVICES.

Ser. No. 60/722,021, filed on Sep. 29, 2005, and entitled INFORMATION POOLS.

Ser. No. 60/724,956, filed on Oct. 7, 2005, and entitled HEATH CARE INFORMATION MANAGEMENT.

Ser. No. 60/725,166, filed on Oct. 7, 2005, and entitled COMPUTER PROGRAMS FOR SEARCH, MANAGEMENT, AND USE OF OUTLINES.

Ser. No. 60/726,542, filed on Oct. 14, 2005, and entitled RSS ENABLED DEVICES.

Ser. No. 60/726,731, filed on Oct. 14, 2005, and entitled SEMICONDUCTER-BASED SYNCIDATION AND OUTLINING.

Ser. No. 60/726,727, filed on Oct. 14, 2005, and entitled SYNDICATION FILTERS.

Ser. No. 60/734,187, filed on Nov. 6, 2005, and entitled OPML SYSTEMS.

Ser. No. 60/734,156, filed on Nov. 6, 2005, and entitled NOTIFICATION SERVICES FOR USE WITH OUTLINING AND SYNDICATION.

Ser. No. 60/735,712, filed on Nov. 11, 2005, and entitled OPML PROCESSING MODULES AND SYSTEMS.

Ser. No. 60/741,770, filed on Dec. 1, 2005, and entitled NAVIGATION AND MANIPULATION OF DISTRIBUTED CONTENT.

Ser. No. 60/741,958, filed on Dec. 2, 2005, and entitled DATABASES USING OPML-BASED CONTENT POOLS AND SYNDICATED CONTENT.

Ser. No. 60/742,975, filed on Dec. 6, 2005, and entitled SYNDICATED DATA IN MEDICAL DECISION MAKING.

Ser. No. 60/749,757, filed on Dec. 13, 2005, and entitled AN ENTERPRISE PLATFORM FOR ENHANCED SYNDICATION.

Ser. No. 60/750,291, filed on Dec. 14, 2005, and entitled CREATING AND MANAGING VIEWS OF SYNDICATED INFORMATION.

Ser. No. 60/751,254, filed on Dec. 15, 2005, and entitled SYNDICATED TELECOMMUNICATION SERVICES.

Ser. No. 60/751,249, filed on Dec. 16, 2005, and entitled USE OF SYNDICATED DATA WITHIN INSTITUTIONAL HEALTHCARE PRACTICES.

Ser. No. 60/753,959, filed on Dec. 23, 2005, and entitled METHODS AND SYSTEMS FOR CREATING AND MANAGING VIEWS OF SYNDICATED INFORMATION VIA A COMMUNICATIONS NETWORK.

Ser. No. 60/756,774, filed on Jan. 6, 2006, and entitled COMPOSITE SERVICE VISUALIZATION TOOLS.

Ser. No. 60/759,483, filed on Jan. 16, 2006, and entitled USE OF SYNDICATED DATA WITHIN HEALTHCARE PROVIDER AND GROUP PRACTICES.

Ser. No. 60/764,484, filed on Feb. 1, 2006 and entitled USES OF MANAGED HEALTH CARE DATA.

Ser. No. 60/777,444, filed on Feb. 27, 2006 and entitled PINGBACK SERVICES.

Ser. No. 60/784,906 filed on Mar. 21, 2006 and entitled SYSTEMS AND METHOD FOR USE OF STRUCTURED AND UNSTRUCTURED DISTRIBUTED DATA.

Ser. No. 60/788,011 filed on Mar. 31, 2006 and entitled SYNDICATED CONTENT RESEARCH METHODOLOGY.

BACKGROUND

The radical proliferation of syndicated content on the World Wide Web, followed more recently by the emergence of so-called Web 2.0 services, evidences a strong desire within the Internet user community for a self-defined environment. In one sense, the use of syndicated content and services such as mashups is highly personalized. Each use can define a very specific, individual view of a universe of syndicated content, and offer customized services built upon third-party programming interfaces. In another sense, the syndication environment is highly collaborative and participatory, with communities of interest arising quickly and assembling around topics or points of view, and sometimes dissipating just as quickly. In either case, content and services change rapidly according to user activity.

Numerous approaches to dynamically deploying services across a network have been devised such as Microsoft's .NET technology, or web services using, e.g., the Web Services Description Language ("WSDL"). While these technology infrastructures support discovery and use of services across a network and can accommodate an evolving set of network-accessible services, would-be users are constrained by the corresponding conceptual and syntactic frameworks. A current trend in Internet services appears to be sharply diverging from this canned approach. Instead, various web-accessible programming interfaces are being published for general use, and these interfaces are discovered and combined on an ad hoc basis by end users. As new programming interfaces and services appear, additional uses and combinations are recognized and deployed in "mashups" that can in turn be republished as web sites or new programming interfaces.

There remains a need for generalized tools to support the creation and use of ad hoc networked services, as well as a single point of contact for computing across the domain of content and services available on the Internet.

SUMMARY

The systems, methods, means, and computer program products disclosed herein provide a framework and tools for creating composite services from the array of services available as distributed, loosely structured, ad hoc, remote programming interfaces on the Internet. The framework includes metaservices for coordinating the execution of multiple services in a composite service, and also provides core services such as database management, security, financial transactions, media conversion, and so forth, to provide greater design latitude in the creation of new composite services from existing Internet content and services. The framework may be deployed to create new services and programming interfaces, or to deploy independent web applications constructed from available services.

In one aspect, a server for network computing may include an HTTP get/post programming interface for accessing a plurality of core services and at least one metaservice, the plurality of core services including one or more of a syndication function, a search function, a conditional access function, an authentication function, a security function, and a database management function, and the at least one metaservice including at least one service for creating a composite service from a plurality of other services, the plurality of other services including at least one remote service with a network-accessible programming interface.

The syndication function may include one or more of publish, subscribe, and read. The search function may include one or more of a keyword search, a time-based search, an author search, and a metadata search. The database management function may include one or more of a read, a write, a delete, a replace, and a query. The metaservice may include at least one service for validating the composite service. The metaservice may include at least one service for validating the at least one remote service. The metaservice may include at least one service for discovering available remote programming interfaces. The metaservice may provide a searchable database of available remote programming interfaces. The server may include a web server providing a graphical user interface for creating the composite service. The graphical user interface may employ a spreadsheet paradigm. The graphical user interface may include a drag-and-drop tool for manipulating services and data sources within the composite service.

In another aspect, a method of semantic computed disclosed herein includes providing an HTTP get/post programming interface to a network-accessible server, the interface including at least one syndication function, at least one search function, and at least one processing function; associating a first URL with an input to the interface; associating a second URL with an output from the interface; and providing an interface description at a third URL, the interface description including a description of the HTTP get/post programming interface and an identification of the first URL and the second URL.

The method may include publishing an RSS feed to the input. The method may include publishing an RSS feed to the output. The method may include associating a third URL with an Application Interaction Interface for the programming interface. The Application Interaction Interface may employ HTML.

In another aspect, a system described herein includes a network; and a database couple in a communicating relationship with the network, the database storing one or more characteristics of a plurality of remote services, each remote service hosted at a remote location on the network, and each remote service accessible through an application programming interface, the one or more characteristics including at least a network location and a programming interface specification for each one of the plurality of remote services, the database including a web interface for structured searching of the one or more characteristics.

The system may include a server associated with the database that provides at least one metaservice. The system may include a server associated with the database that provides at least one core service for creating a composite service.

In another aspect, a programming interface disclosed herein includes an input adapted to receive program data from a first RSS feed; a service that processes the program data; and an output that publishes results of the service to a second RSS feed.

The service may access at least one remote service. The first RSS feed may be published by a second service. A second service may subscribe to the second RSS feed. The programming interface may be employed in a composite service coordinated by a metaservices server.

In another aspect, a method for executing a composite service disclosed herein includes: transmitting data to a first remote programming interface on a network; publishing a result from the first remote programming interface to an RSS feed including at least one element; and submitting the at least one element to a second remote programming interface on a network.

Transmitting data to the first remote first remote programming interface may include publishing an RSS feed. Transmitting data to the first remote programming interface may include transmitting an OPML object.

In another aspect, a method disclosed herein includes exposing a service for access by a user through an HTTP get-post programming interface; and publishing an RSS feed to a URL associated with the service, the RSS feed containing an element that provides a specification for the service.

In another aspect, a method disclosed herein includes exposing a service for access by a user through an HTTP get-post programming interface; and publishing an OPML document to a URL associated with the service, the OPML document providing a specification for the service.

In another aspect, a programming method disclosed herein includes receiving an object that specifies a composite service employing two or more remote programming interfaces; coordinating the invocation of each of the two or more remote programming interfaces; and passing data between at least two of the two or more remote programming interfaces using an RSS feed.

In another aspect, a programming method disclosed herein includes receiving an object that specifies a composite service employing two or more remote programming interfaces; coordinating the invocation of each of the two or more remote programming interfaces; and passing data between at least two of the two or more remote programming interfaces using an OPML object.

At least one of the two or more remote programming interfaces may employ an HTTP interface. Receiving the object may include receiving the object as an HTTP put. The method may include publishing a result of the composite service. The method may include providing an RSS feed that specifies a location and programming interface for the two or more remote programming interfaces.

In another aspect, a programming method disclosed herein includes providing a bi-directional HTTP-based programming interface; receiving user data at a first URL of the interface through a post method; processing the data with at least one logical programming task to obtain a result; and storing the result at a second URL of the interface, such that the result can be retrieved through a get method.

The method may include associating the programming interface with an operational kernel that includes an HTTP server. The method may include providing an OPML description of the programming interface and the at least one logical task, the OPML description structured to accommodate a hierarchy of programming interfaces that define a composite service. The method may include providing an RSS feed that specifies the programming interface. The programming interface may encapsulate a service. The post method may post data for a financial transaction and the service executes the financial transaction. The post method may extract data from a second RSS feed and posts it to the service. The service may execute a financial transaction and the get method publishes a confirmation of execution of the transaction. The method may include inserting the confirmation into a syndicated data feed.

In another aspect, a programming method disclosed herein includes providing a programming interface; receiving user data at a first URL of the interface through a post method; processing the user data with a plurality of services including at least one remote, unstructured service to obtain a result; and storing the result at a second URL of the interface, such that the result can be retrieved through a get method.

The programming interface may encapsulate a web application. The at least one remote, unstructured service may include a URL that links to a specification of the unstructured service. Processing the user data includes parsing an OPML description that includes a hierarchy of services that form a composite service accessible through the programming interface. Processing the user data may include processing a media object. Processing the media object may include converting a format of the media object. Processing the media object may include embedding a digital watermark in the media object. Processing the media object may include adding a unique identifier to metadata for the media object. Processing the media object may include rendering the media object. Processing the media object may include editing the media object. Processing the media object may include combining the media object with another media object. The plurality of services may include at least one social network method. The plurality of services may include an attention brokering service. The plurality of services may include a service for at least one of tracking online behavior, tracking transactions, ranking popularity of an item, and receiving user rating of an item. The plurality of services may include at least one communication service selected from the group consisting of telecommunications, video conferencing, VoIP, electronic mail, instant messaging, and text messaging. The plurality of services may include at least one service that controls presentation of content. The at least one service provides hardware-specific rendering. The plurality of services may include at least one service to enable parental control of access to content. The plurality of services may include at least one service to support conditional access to content. The plurality of services may include at least one service to support user personalization of content. The plurality of services may include at least one service that executes financial transactions. A second one of the plurality of services may include a user identity service. The plurality of services may include a conditional access method. The conditional access method may allow a user to post data via a post method to a service located at a URL, wherein the service verifies permission of the user to access content, and wherein a get method allows the user to get an indicator of permission to access the content. The plurality of services may include at least one database method supporting user access to a database. The database may include a secure database. The database method may include one or more of a data quality method and a data transformation method. The plurality of services may include at least one security method. The at least one security method may include one or more of a conditional access method, an authentication method, an encryption method, and a decryption method. The at least one security method may include a security audit method. The plurality of services may include at least one method for managing payment for at least one other one of the plurality of services. The at least one method for managing payment may include a payment management system that allocates charges among users and providers of a composite service. The plurality of services may include at least one search method. The at least one search method may receive a plurality of search services in an OPML description.

The at least one search method may include a spider method. The plurality of services may include at least one filter method. The plurality of services may include at least one semantic processing method. The method may include creating semantic metadata for an RSS feed in the semantic processing method. The method may include enriching the RSS feed with the semantic metadata. The method may include interpreting content of an RSS feed in the semantic processing method. The method may include translating content of an RSS feed in the semantic processing method. The plurality of services may include at least one syndication method. The method may include performing a syndication function with the at least one syndication method. The syndication function may include one or more of publish, subscribe, aggregate, and republish.

In another aspect, a method disclosed herein may include spidering an environment to generate one or more resource descriptions that characterize one or more resources available in the environment, including a resource type for each of the one or more resources; and storing the resource descriptions in a searchable database, the database indexed by the resource type. The one or more resources include at least one service available in the environment. The at least one service may include an unstructured service. The at least one service may include a web service. Spidering may include invoking a spider at a metaservices server.

In another aspect, a semantic process disclosed herein may include a bi-directional HTTP client-server user interface for allowing get, post, put and delete methods; and a plurality of services responsive to the interface, the services including at least one database service for accessing data, at least one semantic processing service, and at least one application service that present results in a format suitable for presentation on a client device.

Each method disclosed herein may also be implemented as computer executable code that, when executing on one or more computing devices, performs the steps of the method.

BRIEF DESCRIPTION OF THE FIGURES

The foregoing and other objects and advantages of the invention will be appreciated more fully from the following further description thereof, with reference to the accompanying drawings, wherein.

DETAILED DESCRIPTION

A platform for processing in a wide scale network may be supported through a collection of logical software modules exposed to external users through an interface such as an HTTP get/post interface. The server supporting these services may access other services and provide services to other such services, in an arrangement where services can also act, for example, as a client of a remote (or local) service, each communicating through get, put, post, and delete methods. This allows the logical software modules to be arranged in user-defined or machine-defined configurations, with the output of one module being provided as the input to another, whose output is the input to yet another, and so on. In addition, this allows services to access external services as a client, permitting implementation of any services that can be defined using the core services described herein, either alone, or in combination with exposed services available on the network. Thus, it will be appreciated that while the system described below with reference to FIGS. 1-12 is one useful approach to deploying individual services in a manner that accommodates use and combination with other services, the techniques described herein may more generally be applied to the creation and management of composite services, and all such variations that would be clear to one of ordinary skill in the art are intended to fall within the scope of this disclosure.

Figure 1:
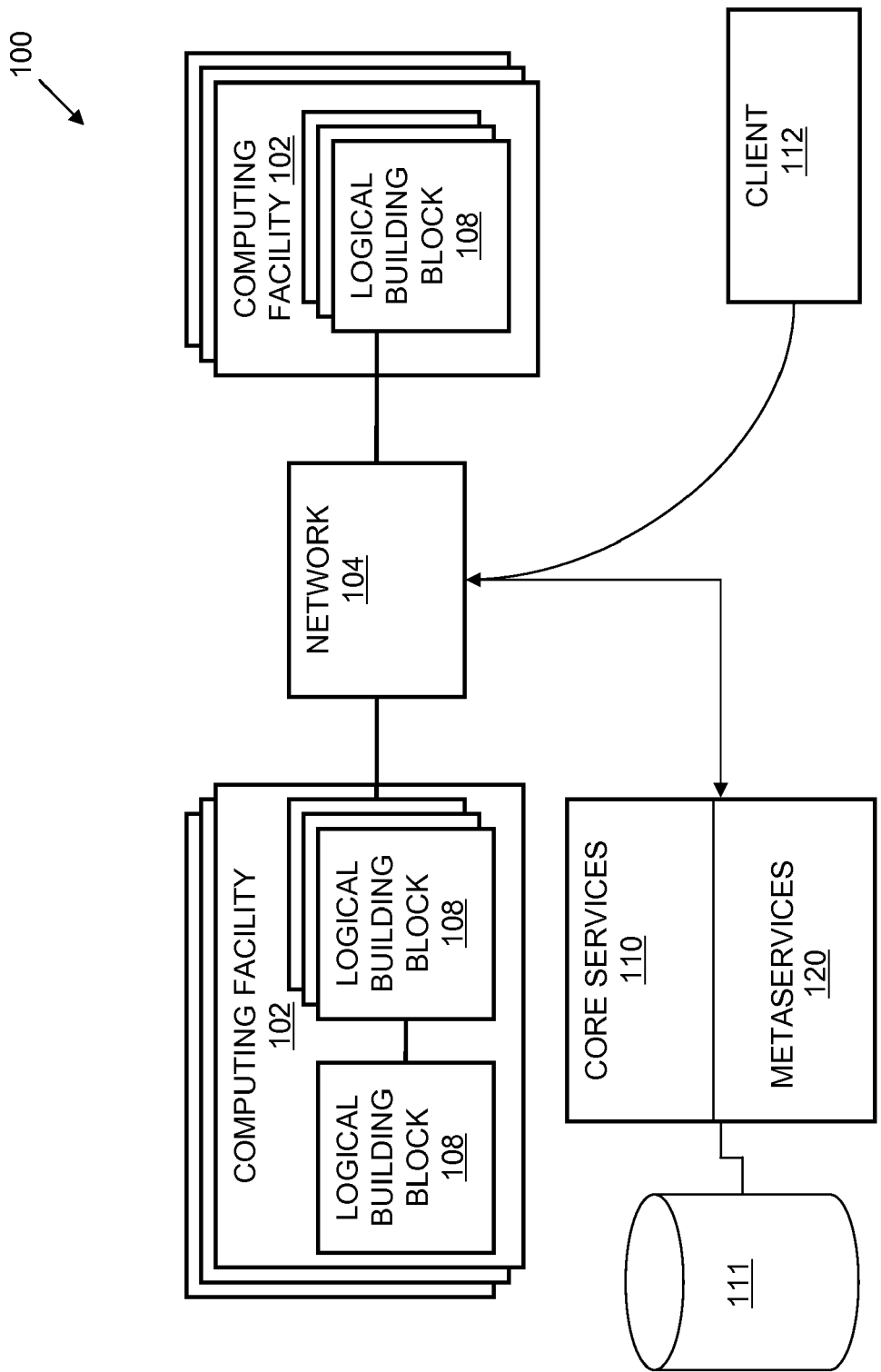
FIG. 1 shows computing facilities communicating through a network facility.

Referring to FIG. 1, a system 100 may include a plurality of computing facilities 102 that are operatively coupled via a network 104. Within the computing facilities 102 are one or more logical building blocks 108, which themselves may be operatively coupled. In embodiments, this coupling may be between at least two logical building blocks 108 within the same computing facility 102. Alternatively or additionally, this coupling may be between at least two logical building blocks 108 within different computing facilities.

The network 104 may be an IP-based data network providing data communications between at least two computing facilities 102. This network may include the Internet, a WAN, a MAN, a LAN, a personal-area network, or any other IP-based data network, including any IP-based network component, in any arrangement or configuration. The network 104 may also, or instead, employ non-IP communications such as Asynchronous Transmission Mode communications or any other suitable communications protocol(s).

The computing facility 102 may be a microprocessor-based computer. This computer may include a rack-mount server, a workstation, a tower computer, a laptop computer, a personal computer, a palmtop computer, a portable computer, a cellular phone, a set top box, a router or other network element, a portable communications device such as a Blackberry, an embedded computer, a computer associated with a sensor (such as may be used in a distributed sensor network), and so forth.

The logical building block 108 may be implemented as a software program. This program may be associated with one more processes and/or one or more threads of execution. The building block 108 may be composed of a number of software components, which are described in great detail hereinafter. It will be understood that, while a microprocessor is one common embodiment of a device executing software such as the logical building block 108, the computing facility 102 may also, or instead, include an ASIC, FPGA, PLA, PLD, or any other special-purpose hardware device that is fabricated and/ or programmed to execute the building block 108. Throughout this disclosure, it should be appreciated that terms such as "software", "program", and "execution", are to be interpreted broadly as any implementation of a logical process, unless a different meaning is explicitly provided or otherwise clear from the context.

Core services 110, which may be for example any of the services described below, along with related methods and interfaces, may be available through the network 104. The core services 110 may provide any functionality suitable for supporting, combining, and publishing new services formed from the services of the computing facilities 102, which may be ad hoc services, and any services selected from the core services 110. It will be understood that the computing facilities 102 as described herein may generally provide any ad hoc services along with self-defined programming interfaces. As will be discussed in greater detail below, the core services 110 may include services for discovery, indexing, documentation, and assessment of such services in order to facilitate end use by clients 112. The core services 110 may also include any number of services that support creation of new composite services by providing, e.g., security, conditional access, transaction processing, data conversion, and any other functions that might commonly be employed to build sophisticated services from ad hoc functional building blocks available on the Internet. In one aspect, the core services 110 may operate generally as a server, or a single point of contact on a network for various services.

Note that in FIG. 1, metaservices 120 are depicted separately from core services 110. This reflects the general concept that metaservices 120, i.e., services for managing services, are distinct from other services that may be employed to support a robust metaservices infrastructure, i.e., core services 110. It will be appreciated that this distinction may blur with respect to certain services. For example, where a filter is employed in passing RSS data from one service to another service, this may be viewed as a metaservice or a core service. As such, these terms should be understood to be correspondingly flexible in the following discussion, unless a specific meaning is indicated or otherwise clear from the context. It will also be understood that, while FIG. 1 depicts the core services 110 and metaservices 120 at a single network location, these services may be separate, and/or may be distributed across a network at two or more redundant and/or unique locations.

In one aspect, the core services 110 may be viewed as a coherent integration solution stack including a number of discrete layers. Each layer may provide a well-defined interface to two adjacent layers, as in a conventional protocol stack. In this manner, each functional area may be developed independently by numerous parties each of whom may improve, customize, optimize, or otherwise adapt the layer to specific or generalized usage. Alternatively, each layer may operate as a stand-alone collection of services that may be invoked independently of other layers. Numerous other configurations are possible, and will be clear to one of ordinary skill in the art. All such arrangements are intended to fall within the scope of this disclosure. The relevant features may be decomposed in a variety of manners. One example is set out in U.S. application Ser. No. 11/223,826, the entire contents of which are incorporated herein by reference. As another example, an integration stack may include the following services generally intended to support integration of other remote services into composite services or platforms.

Layer seven: One layer of the stack may contemplate various modes of human communication and interaction, and enable sharing and usage among communities and users in various combinations. This may include, for example, communities, swarms, cross-functional teams, collaborations, dialogues.

Layer six: One layer of the stack may relate specifically to media outputs of various forms, such as interactive media, communication and information services.

Layer five: One layer of the stack may address metaservices, such as the discovery, integration, modification, and adaptation of services, along with searching and publication thereof. This may include integration of web services, superservices, scripts, metatools, superservice libraries, automated testing of end-to-end integrations of services such as those described herein, and any other services and/or content, and the like. As noted above, metaservices 120 may optionally be deployed as separate and discrete from core services 110, in which case this layer of an integration stack may be omitted, or may simply point to or interface with a separate metaservices 120 component.

Layer four: One layer of the stack may address certification of operability and interoperability with reference to one or more standards, such as objective, publicly available standards for operability of the layer three web superservices. Generally, this may address performance matters such as usability, relevance of performance achieved, stability, reliability, scalability, openness and extensibility, software compatibility, hardware compatibility, end-to-end compatibility, and so forth. This may also, or instead, address standards compatibility with relevant standards such as XML, HTML, RSS, OPML, WSDL, and so forth.

Layer three: One layer of the stack may address decomposition and reuse of services such as web superservices. This may include development of utilities to compose, publish, secure, authenticate, gather, archive, search, filter, analyze, display, email, or otherwise manipulate services. Alternatively, some or all of this low-level service/superservice manipulation may be incorporated into the Layer five metaservices described above.

Layer two: One layer of the stack may embrace participation by a worldwide community of users, activist, developers, entrepreneurs, or otherwise contemplate inclusion of various disparate users and sources of services. This may advantageously provide a common, shareable platform for developing superservices and metaservices. It will be noted that this layer is distinguished from layer seven, which relates to the manner in which discrete services or composite services are presented to end users, while layer two relates to the manner in which developers and others participate in creation of new services.

Layer one: One layer of the stack may provide low-level physical connectivity for the variety of simple, stable, ubiquitous standards (URL, SOAP, RSS, OPML, XML, HTML, etc.). This layer ensures that inputs to and outputs from other layers can communicate with external resources and users.

It will be appreciated that integration of services may be accomplished in a number of different ways, and may include different allocations of components in the integration stack. In one embodiment, significant advantages may be realized from a standardized, end-to-end model to interconnect communities of users with low-level physical protocols and services deployed thereon. In general, this conceptual architecture provides a platform for customizing and integrating the functionality of arbitrary combinations of ad hoc services deployed as remote, third-party programming interfaces. Using the platform described herein, application programming interfaces such as those available from Google, Google Maps, MSN Search, eBay, Amazon, Yahoo, and myriad lesser-known providers of network-accessible programming interfaces, can be integrated into a new, composite service which may be used privately or released as a new programming interface or as a self-contained Application Interaction Interface ("AII")—a web application adapted for direct human use through a browser or other client.

A database 111 may support the core services 111 both by storing procedures and code for the core services 110, and by providing a data repository or database for users of the core services 110. In addition, the core services 111 may provide a data store for external services, such as ad hoc services running on the computing facilities 102. As will be appreciated from the description below, this may advantageously expand the functionality of ad hoc services by providing a buffer for inputs to or outputs from these services when sequencing of a chain of operations from different ad hoc service locations. More generally, those of ordinary skill in the art will appreciate many advantageous uses of persistent memory. Further, the core services 110 may provide differential levels of database services. For certain users, such as authenticated users, the database 111 may be available for general usage in connection with core services 110 or otherwise. For other users, the database 111 may not be available. In this latter environment, the core services 110 may provide a service that permits a user to incorporate the user's local storage, such as storage on the client 112, as a database or short term memory store. While the database 111 is depicted as a conventional database 111 behind the core services 110 and/or metaservices 120, it will be understood that other techniques may be employed to provide an actual or effective database in connection with composite services and metaservices.

In one aspect, RSS or a similar syndication technology may be employed for data persistence between stages of a composite service. Thus, a metaservice 120 or other program coordinating execution of a composite service may direct a first service to output an RSS feed. The URL of the RSS output may then be used as an input to a second service, and so forth. As a significant advantage, this approach provides a simple, convenient, ubiquitous, and readily accessible resource as a buffer for composite service processing. Using techniques described, for example, in U.S. application Ser. No. 11/223,826, entitled "Enhanced Syndication" these RSS streams may, in turn, be secured to provide for conditional access based on user identity (which may be encoded by the metaservice or composite service that is using the RSS buffer) . Access to these process-oriented RSS feeds may be permissions based, or otherwise restricted. In one aspect, intermediate or final RSS feeds may be useful in multiple ways, and it may be desirable to have intermediate data streams available for general, public use. In another aspect, intermediate or final RSS feeds may be highly proprietary, and it may be desirable to have some level of security associated with content therein.

As an additional component, it may be useful to monitor pools of data associated with processing of composite services. That is, a large amount of data may be generated and distributed among numerous RSS sources on a network. An audit tool may be provided for reviewing and analyzing levels of security on such sources. This may include an analysis of the content and vulnerability of such sources, with respect to either each source as a network resource or the underlying data, or both. While this tool may provide for useful security audits of an RSS-based data store for composite service processing, it will be understood that a tool for security audits of RSS data may have significant value independent of the composite services discussed herein. That is, an enterprise, publisher, or other entity may periodically audit RSS sources for vulnerabilities, with respect to, for example, whether data is secured in the manner intended. Where security flaws are identified, the audit tool may employ remedial measures such as securing the source of RSS data, e.g., by requiring suitable encryption on RSS output, or by securing or quarantining the offending RSS feeds. The audit tool may also, or instead, evaluate security risks based upon the data sources available to an RSS feed. In such cases, suitable responses may include filtering output from the feed to remove any secured source data, along with hardening the source itself against filter circumvention. Thus, there is disclosed herein a general tool for evaluating security exposures associated with syndicated data, and more generally, any pools of unstructured or structured data. The tool may provide a security profile characterizing data exposure. The tool may also or instead, actively secure sources according to a security policy, or make recommendations concerning exposure and risk mitigation.

The client 112 may be any device communicating with the network 104. In general, the client 112 may access various combinations of the core services 110 and the ad hoc services from the computing facilities 102 to provide a composite service, described in greater detail below. The composite service may in turn be published as a new ad hoc service through a user-defined programming interface, either through the core services 110 and related infrastructure, or on a user-selected server available through the network 104.

Thus, in general there is disclosed herein a technique for supporting use and combination of ad hoc remote services through one or more core services and/or that are available on a network.

Figure 2:
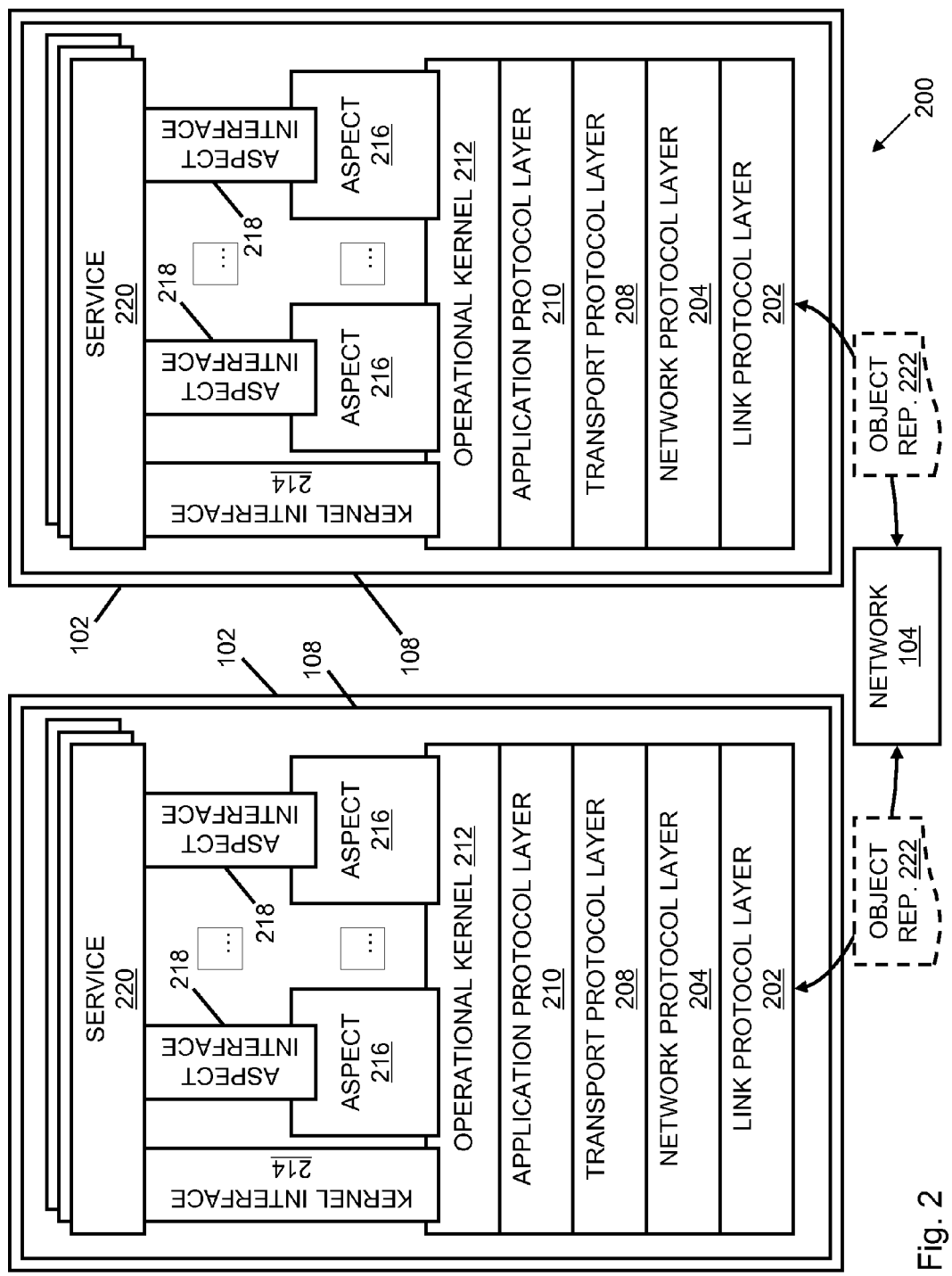
FIG. 2 shows communication among software modules of separate computing facilities.

Referring now to FIG. 2, a system 200 including two computing facilities 102 may support communication among services. Each of the computing facilities 102 in this depiction contains one logical building block 108. Within each of the logical building blocks 108 are a number of software components. These may include, for example, a link protocol layer 202; a network protocol layer 204; a transport protocol layer 208; an application protocol layer 201; an operational kernel 212 with a kernel interface 214; a plurality of aspects 216, each of which has an aspect interface 218; and a plurality of service software modules 220 that are operatively coupled to the operational kernel 212 and the aspects 216 via the interfaces 218. The link protocol layer 202 may be implemented to provide a logical coupling to the network 104, such as via Ethernet, WiFi, ATM, and so forth; the network protocol 204 layer may implement IP (v4 and/or v6); the transport protocol layer 208 may implement TCP; and the application protocol layer 210 may implement HTTP. The operational kernel 212 implements methods of the kernel interface 214, which are described in detail hereinafter. The aspects 216 of the operational kernel implement methods of the aspect interfaces 218, which are also described in detail hereinafter. The server software modules may implement arbitrary services 220 by utilizing any native functionality of the computing facility 102 combined with the implementations provided by the operational kernel 212 and its aspects 216. The native functionality of the computing facility 102 may be any of the functions or features of a computer and a resident operating system on the computer. It will be appreciated that the resident operating system may be any operating system, including a proprietary operating system (such as Windows XP), an open-source operating system (such as OpenBSD), a real-time operating system, an embedded operating system, and so forth. Likewise, it will be appreciated that the functions and features of the computing facility 102 may vary from implementation to implementation and that the present invention is not limited to any particular type of computing facility 102 or operating system. Moreover, it will be appreciated that there is not an intrinsic need for an operating system, and in some embodiments the logical building block 108 may run directly on hardware of the computing facility 102.

As depicted, the boundaries between the software modules are logical boundaries. According to software engineering practices, these software modules may be implemented as individual software modules. However, the software modules may also be implemented in a more monolithic fashion, with logical boundaries omitted or loosely defined in the implementing source code. For example and without limitation, a network protocol stack of several layers may be implemented in a single, monolithic tract of source code. It should be appreciated that various levels of integration or modularity may be reflected in a particular implementation of the software modules. All such implementations are within the scope of the present invention. In an embodiment, the operational kernel 212, its aspects 216, and the service software modules 220 are written in a modular fashion, with the aspects 216 coupled to the operational kernel 212 via a well-defined interface (depicted simply as a boundary between the aspect 216 and the operational kernel 212) and with the service software modules 220 accessing the services provided by the operational kernel 212 and its methods solely via the methods of their interfaces 214.

The methods of the interfaces 214, 218 that are implemented by the operational kernel 212 and its aspects 216 provide an abstraction of the underlying software modules and computing facility 102. Some of these services may be implemented and provided by the operational kernel 212 itself, some may be implemented and provided by the aspects 216 of the operational kernel, and others may be implemented and provided by the service software modules 220. As a general guideline, certain core services 110 may be provided by the operational kernel where those services that are commonly used or required, while services that are application-specific may be implemented by the service software modules 220. It will be appreciated that which services should be implemented in which modules may vary, or may change over time.

Generally, as referred to here, a service provides a useful, concrete, and tangible result, such as by executing a logical process of a logical building block 108. This logical process can include an implementation of an interface 214 and/or 218, an implementation of a service software module 220, an implementation of an operational kernel 212, an implementation of software provided to the logical building block 108, an implementation of a software module of the logical building block 108, or the implementation of any other software associated with the logical building block 108. Certain services, such as superservices, web services, composite services, and metaservices are discussed in greater detail below. In general, services provided through non-standard application programming interfaces from remote network resources—interfaces such as Google Maps—are referred to herein as ad hoc or unstructured services, and are also intended to fall within the scope of services as that term is used herein.

The system described herein may employ message-passing to communicate an object representation 222 among logical building blocks 108. When building blocks 108 exist in different computing facilities 102, the network 104 provides the communication of the object representation 222 between the logical building blocks 108. In this case, the object representation 222 is transmitted and received by the link protocol layers 202 of the logical building blocks 108. The communication of the object representation 222 may be performed in a one-to-one fashion, with a single building block 108 communicating the object representation 222 to another single building block 108. In alternate embodiments, the communication may be performed in a one-to-many or many-to-many fashion. In these alternate embodiments, the communication may utilize a multicast or broadcast technique or protocol.

The object that is represented by the object representation 222 can be any data including an element of a file-stream; a file-stream; a pool of file-streams; a relation or configuration; a tag; a service; an external reference such as a URI or URL, a description, specification, or outline of any of the foregoing; or any other data. For convenience, all of these things that are herein referred to as the object. The data may include an RSS feed; an OPML file or object; an XML file; an HTML file; an HTTP stream; an RTP stream; an image file; an audio file; an audiovisual file; a text file; a Word document; a Javascript file; and so forth.

Thus there is described herein a generalized technique for sharing instructions and data among ad hoc services in a networked computing environment. As noted above, where a composite service employs a number of services in sequence (or in parallel), an RSS-based buffer or other database 111 may be employed to cache interim and/or final results.

Figure 3:
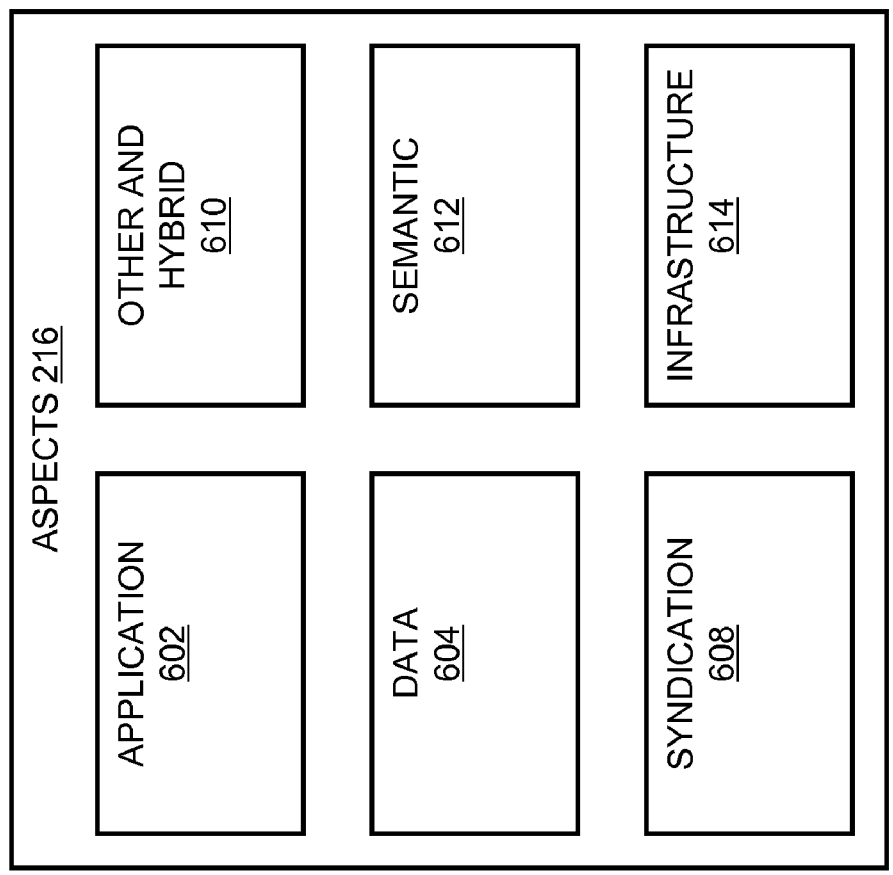
FIG. 3 illustrates aspects of software modules.

FIG. 3 shows aspects of an operational kernel. The aspects may be arranged around a canonical organization of core or atomic functions desirable for facilitating generalized use of loosely structured or ad hoc network services—the core services 110 described in reference to FIG. 1. The aspects of the operational kernel may without limitation include an application aspect 602, a data aspect 604, a syndication aspect 608, and other or hybrid aspect 610 (referred to hereinafter as the other aspect), a semantic aspect 612, and an infrastructure aspect 614. Other aspects may be useful in various processing contexts, and may be included in the operational kernel or as services associated therewith, such as transactions (i.e., events involving exchange of funds), security, encryption, and authentication. Numerous arrangements and hierarchies are possible for these core services. FIG. 3 suggests one canonical arrangement of services by way of example and not by way of limitation. FIG. 3 provides high-level descriptors for data processing, semantic processing, syndication process, infrastructure processing, and so forth. Each of these aspects is discussed in greater detail below.

Figure 4:
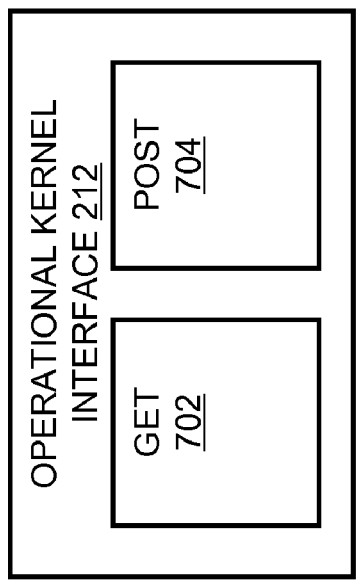
FIG. 4 depicts an operational kernel interface.

FIG. 4 shows a high level depiction of an HTTP-based programming interface for accessing services. Referring to FIG. 4, the operational kernel interface 212 for accessing aspects of the operational kernel such as those described above may include a Get method 702 and a Post method 704. The Get method 702 provides a way of getting an object from a URL or providing the object at the URL. The Post method 704 provides a way of posting an object to a service at a URL or accepting an object posted to a service at a URL. The operational kernel interface may also include a Put method and a Delete method. The Put provides a way of putting an object to a URL or accepting an object that is put to a URL. The Delete method provides a way of deleting an object at a URL, including requesting that the object be deleted or accepting the request and deleting the object in response to the request. These methods may collectively provide a bi-directional HTTP-based programming interface where the Get 702, Put, Post 704, and Delete methods are implemented according to HTTP, while the operational kernel 212 operates as an HTTP client and an HTTP server. In other embodiments, the Get 702, Put, Post 704, and Delete methods may be implemented via SMTP or any other protocol that allows bi-directional communication.

The system may present a variety of services or functions to external users through a programming interface accessed using the methods of the operation kernel. A number of such functions and services that might be usefully provided in a processing environment are described below. In general, these services may provide a functional platform for integrating disparate services. This can accommodate ad hoc combinations of unstructured services, each of which may be available as a programming interface on a network, by providing a set of core services to augment functionality. Thus, for example, ad hoc combinations of services can further incorporate security measures such as conditional access or authentication with reference to a trusted third party, or incorporate semantic processing, search, data processing, and so forth.

Figure 5:
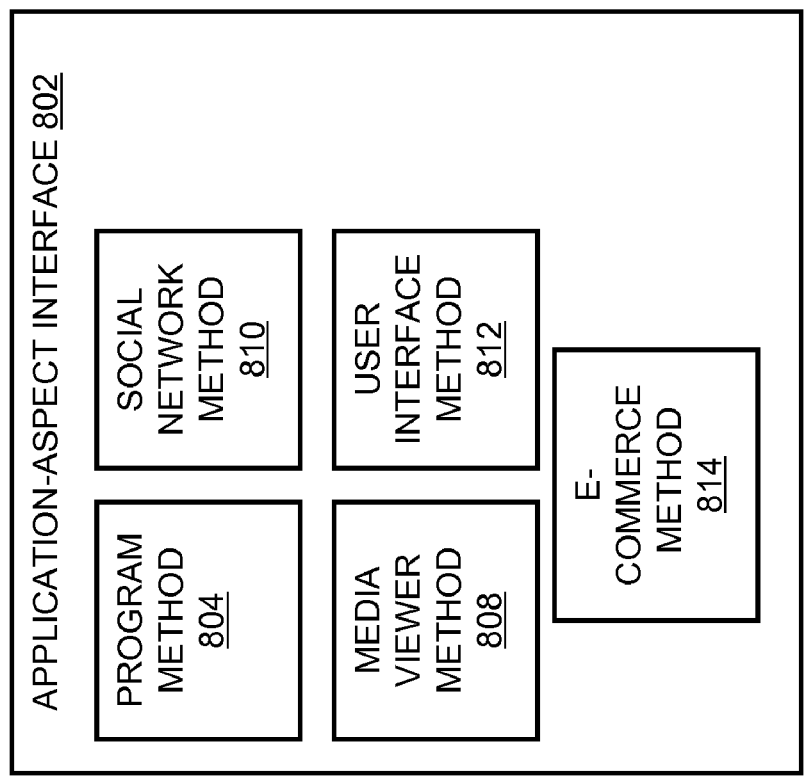

Referring now to FIG. 5, the application-aspect interface 802 may provide a variety of methods related to interaction with client-side applications. This may, for example, include a program method 804, a media viewer method 808, a social network method 810, a user interface method 812, and an e-commerce method 814. The program method 804 may provide accessing to an application executed or interpreted by a logical building block 108. The media viewer method 808 may provide a service that processes a media object, such as by preparing for display or converting between media formats. The social network method 810 may provide a service that relates to social networking such as attention brokering, popularity measurement, rankings, and so forth, and may support social networking among participants by supporting groups, buddy lists, affiliations, preferences, and so forth. The user interface method 812 may control presentation of content to an end user according to, e.g., display hardware, screen layout preferences, substantive preferences, and so forth. The e-commerce 814 method may provide services specific to a market, industry, or user group including without limitation formatting of data or performing transactions according to industry customs or standards. This may also include forms of electronic payment, credit evaluations, and e-commerce techniques such as shopping carts, catalogs, and so forth.

Figure 6:
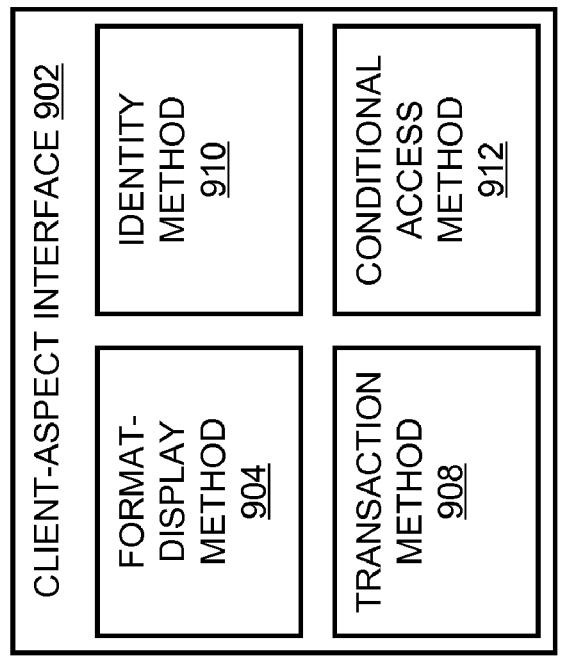
FIGS. 5-10 depict aspects of various processing interfaces that may be exposed through programming interfaces.

Referring now to FIG. 6, the client-aspect interface 902 may include a variety of methods specific to client interactions with a service. For example, this may include a format-display method 904, a transaction method 908, an identity method 910, and a conditional access method 812. The format-display method 904 provides a way of formatting or specifying a format of an object for rendering on a target display.

The transaction method 908 may provide a way of conducting a transaction. It will appreciated that a wide array of transactions and payments may be usefully employed with the systems described herein. Transactions may include, for example, receiving and/or executing financial transactions using a variety of payment infrastructures including ACH, credit card, wire transfer, PayPal and similar commercial payment services, and so forth. As another example, and not by way of limitation, transactions may include financial transactions related to use of the core services 110, metaservices 120, and other, third party services as described generally herein. For example, the core services 110 may support pay-per-use or subscription models for internal services and remote services. Where remote services are employed, the system may track usage and provide periodic reporting. The system may further support automated or manual payment for such services through the core services 110 transaction method 908.

More generally, the transaction method 908 may support tracking of usage charges for complex composite services. That is, a user may create and publish a composite service through the system that employs other ad hoc services, one or more of which require payment (e.g., a subscription, a database access charge, a time charge, a processor time charge, or the like). At the same time, the composite service publisher may specify fees for the composite service, which may be fixed or variable, and may depend on third party usage costs. The transaction method 908 may bill charges to, or collect charges from, a user of the composite service, and may further manage payment among the publisher and any of the ad hoc services. When coupled with security features provided by other core services 110 described herein, this may support, for example, an enterprise computer platform that outsources certain services such as payroll processing or access to digital libraries on a pay-as-you-go or per-user basis. More generally, this platform supports integration of disparate, commercial services for individual or enterprise use, which may also be seamlessly combined with any related non-commercial ad hoc services.

In another aspect, the transaction method 908 may cooperate with e.g., methods of the infrastructure-aspect interface 1302 or the data-aspect interface 1002 to manage payment for enhanced service. Thus, for example, a publisher or user of a composite service that includes commercial, third-party, ad hoc services may pay for guarantees or service levels related to QoS, bandwidth, processing throughput, and the like. Similarly, a user (or publisher) of a composite service may coordinate cost-effective usage of services, such as by scheduling use of certain commercial services at lower-cost, off-peak times. In one embodiment, the composite service may simply be a scheduler for scheduling work to a commercial service provider in a cost-effective manner. In various embodiments, a composite service may provide a single login access point for combined authentication, service usage, and payment.

The identity method 910 may provide a way of accessing, establishing, verifying, evaluating or otherwise processing an identity or identity attribute. The conditional access method 921 may provide a way of specifying or enforcing a conditional access rule, or otherwise controlling access to data on a conditional basis. As illustrated by some of these examples, one or more aspects may reside in multiple interfaces, or reasonably be incorporated into different interfaces. For example, the identity and conditional access methods may be associated with a security interface or infrastructure interface. All such variations are intended to fall within the scope of this disclosure.

Figure 7:
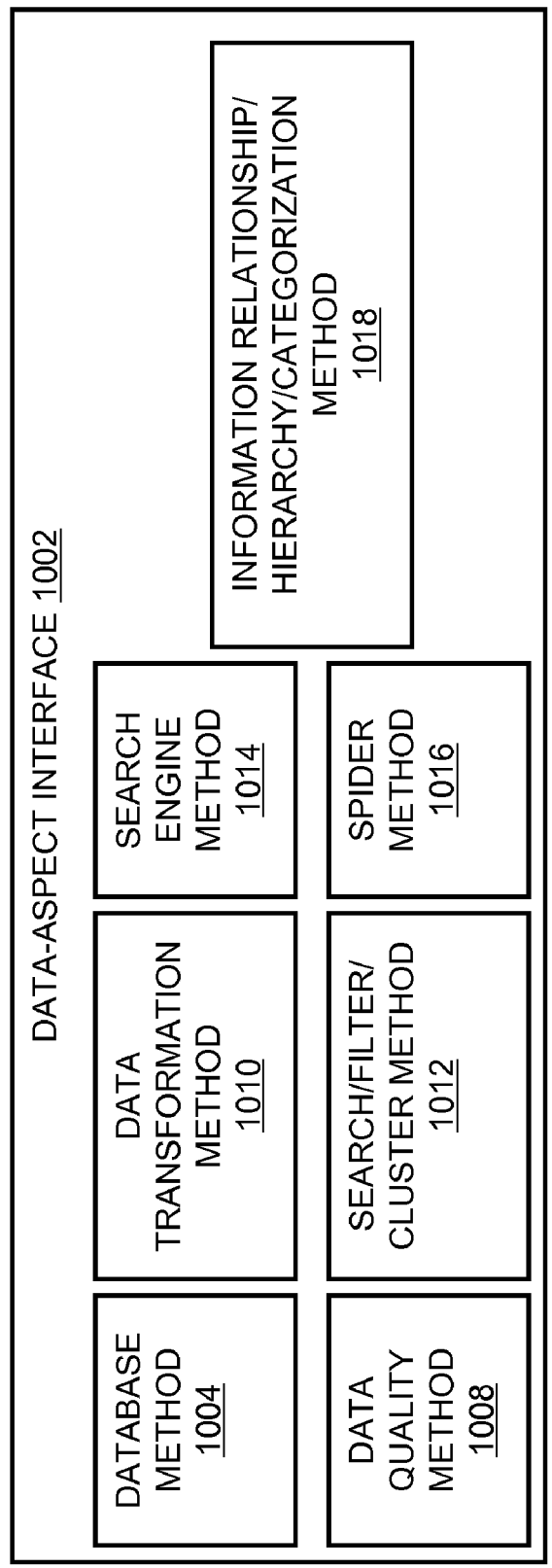

Referring now to FIG. 7, the data-aspect or search-aspect interface 1002 may include methods generally related to data manipulation. This may include a database method 1004, a data quality method 1008, a data transformation method 1010, a search/filter/cluster method 1012, a search engine method 1014, a spider method 1016, and an information relationship/hierarchy/categorization method 1018. The database method 1004 may provide a way of accessing or providing a database or database management system. The data quality method 1008 may provide a way of accessing or providing a quality metric associated with the object. The data transformation method 1010 may provide a way of accessing or providing a service that transforms an object from one representation to another. The search/filter/cluster method 1012 may provide a way of accessing or providing a service that searches, filters, and/or clusters objects. The search engine method 1014 may provide a way of accessing or providing a search engine. The spider method 1016 may provide a way of accessing or providing a spider. The information relationship/hierarchy/categorization method 1018 may provide a way of accessing or providing service that relates to an information relationship, hierarchy, or categorization. Uses of these and other atomic services are described in greater detail below.

Figure 8:
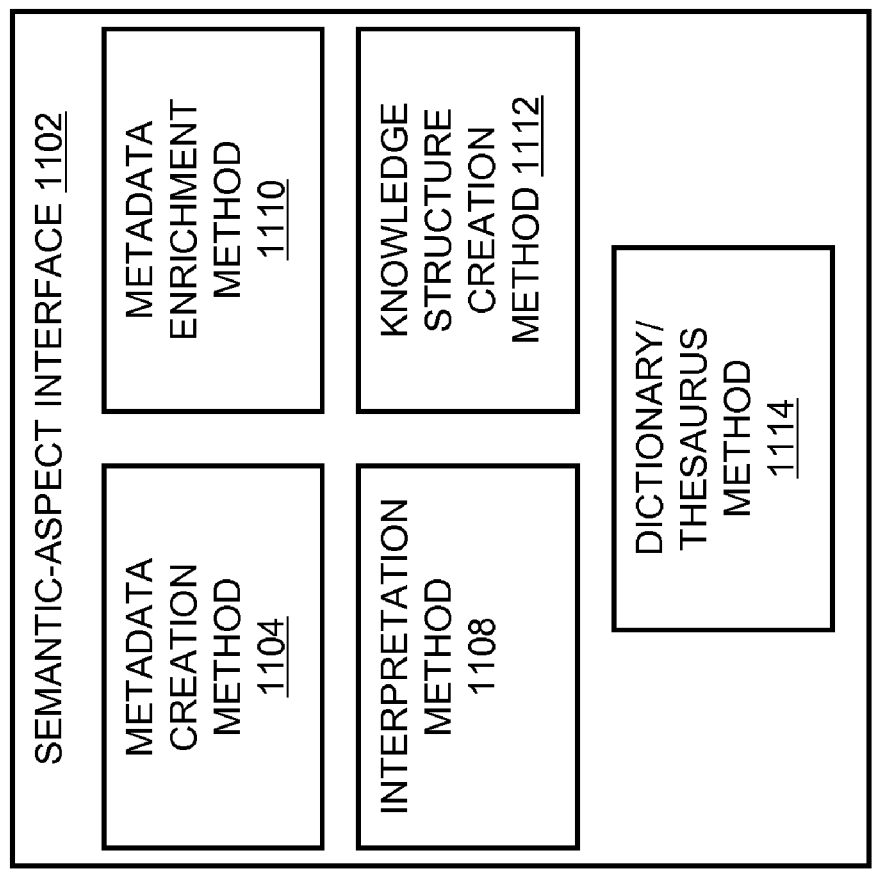

Referring now to FIG. 8, the semantic-aspect interface 1102 may include methods that generally support semantic processing. This may include, for example, a metadata creation method 1104, an interpretation method 1108, a metadata enrichment method 1110, a knowledge structure creation method 1112, and a dictionary or thesaurus method 1114. The metadata creation method 1110 may provide a way of accessing or providing a service that creates metadata. The interpretation 1108 method may provide a way of accessing or providing a service that interprets or translates an object using natural language processing. The metadata enrichment method 1110 may provide a way of accessing or providing a service that enriches metadata. The knowledge structure creation method 1112 may provide a way of accessing or providing a service that creates a knowledge structure. The dictionary or thesaurus method 1114 may provide a way of accessing or providing a dictionary or thesaurus. In general, these methods may support semantic processing and manipulation of data. Other supporting functions may be similarly provided, such as an identification method that can provide a globally unique identifier upon request, and/or add such a globally unique identifier to metadata for a media object or other content. In one embodiment, the core services 110 may include this service. In another embodiment, the identifier service may be provided by a trusted third party that can certify identification numbers and usage thereof.

Figure 9:
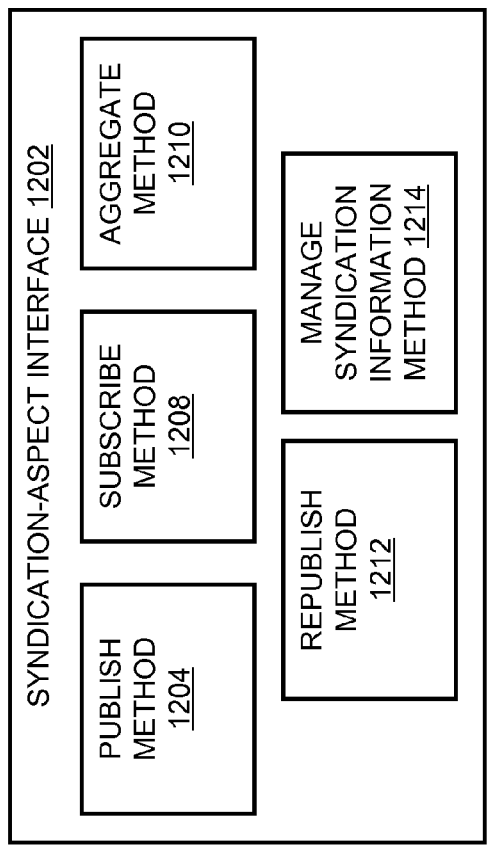

Referring now to FIG. 9, the syndication-aspect interface 1202 may support syndication functions. This may include a publish method 1204, a subscribe method 1208, an aggregate method 1210, a republish method 1212, and a manage syndication information method 1214. The publish method 1204 may provide a way of accessing or providing a service that publishes an object. The subscribe method 1208 may provide a way of accessing or providing a service that subscribes to an object. The aggregate method 1210 may provide a way of accessing or providing a service that aggregates objects. The republish method 1212 may provide a way of accessing or providing a service that republishes objects. The manage syndication information method 1214 may provide a way of accessing or providing a service that manages syndication information. In general, these methods may support syndication functions. In general, these methods may support fundamental syndication functions that enable subscription-based distribution and re-distribution of data.

Figure 10:
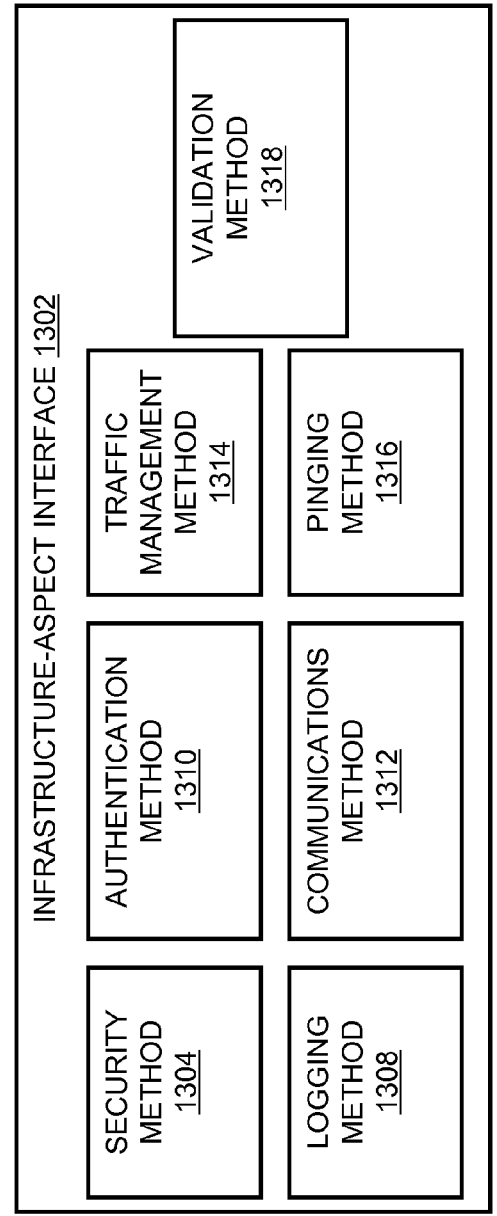

Referring now to FIG. 10, the infrastructure-aspect interface 1302 may provide methods related to network or service management infrastructure. In general, these methods may support an infrastructure for using ad hoc services by providing fundamental network and data functions. This may include a security method 1304, a logging method 1308, an authentication method 1310, a communications method 1312, a traffic management method 1314, and a pinging method 1316. The security method 1304 may provide a way of accessing or providing a service that may provide network or data security. The logging method 1308 may provide a way of accessing or providing a logging service. The authentication method 1310 may provide a way of accessing or providing an authentication service.

The communications method 1312 may provide a way of accessing or providing a communications service. This may include, for example, access to low-level functions such as network and physical layer protocols. This may also, or instead, include various protocols for conventional communications types such as e-mail (e.g., SMTP, POP, Microsoft Exchange Server), collaborative platforms (e.g., Lotus Notes), VoIP, instant messaging, video conferencing, text messaging, telecommunications, and so forth. In an alternative embodiment, the communications method 1312 may support network communications protocols while, for example, the social network method 810 of the application-aspect interface supports higher-level communications protocols.

The traffic management method 1314 may provide a way of accessing or providing a traffic management service. In one aspect, this method may provide reporting on current or historical traffic and usage, which may be provided by corresponding services, or may be independently monitored and reported within the core services 110, or both. These metrics may be reported on a per user basis, on a per service basis, or in any other combination useful to a recipient. It will be understood that, as with many of the other methods described herein, the method may be adapted to receive highly parameterized requests for data, such as traffic request for a specific service as used by a specific group of users over a specific time period, or the method may provide very simple, low-level functions, with other core services 110 or metaservices 120 providing functionality to extract desired reports from raw data extracted by the method. When used in combination with other core services 110 or other services, this method may be configured to generate and forward periodic reports. In another aspect, this method may provide tools for proactively managing usage of services. This may include, for example, scheduling and prioritization of usage, and reports on status of currently executing composite services.

The pinging method 1316 may provide a way of accessing or providing a pinging service.

A validation method 1318 may support evaluation and validation of remote services. This may generate user-specified or automated test calls to remote services to ensure proper functioning, such as by reference to a published specification of a corresponding programming interface. More generally, this method may support a host of metrics for remote, ad hoc services including reliability, mean time between failure, performance, bandwidth, latency, quality of service, availability, and the like. Related services may include audits for security, reliability, and so forth. This method may also be used in combination with the traffic management method 1310 described above to more efficiently schedule processes, or to optimize system usage based upon variations in current and anticipated usage of various services underlying a composite service.

Figure 11:
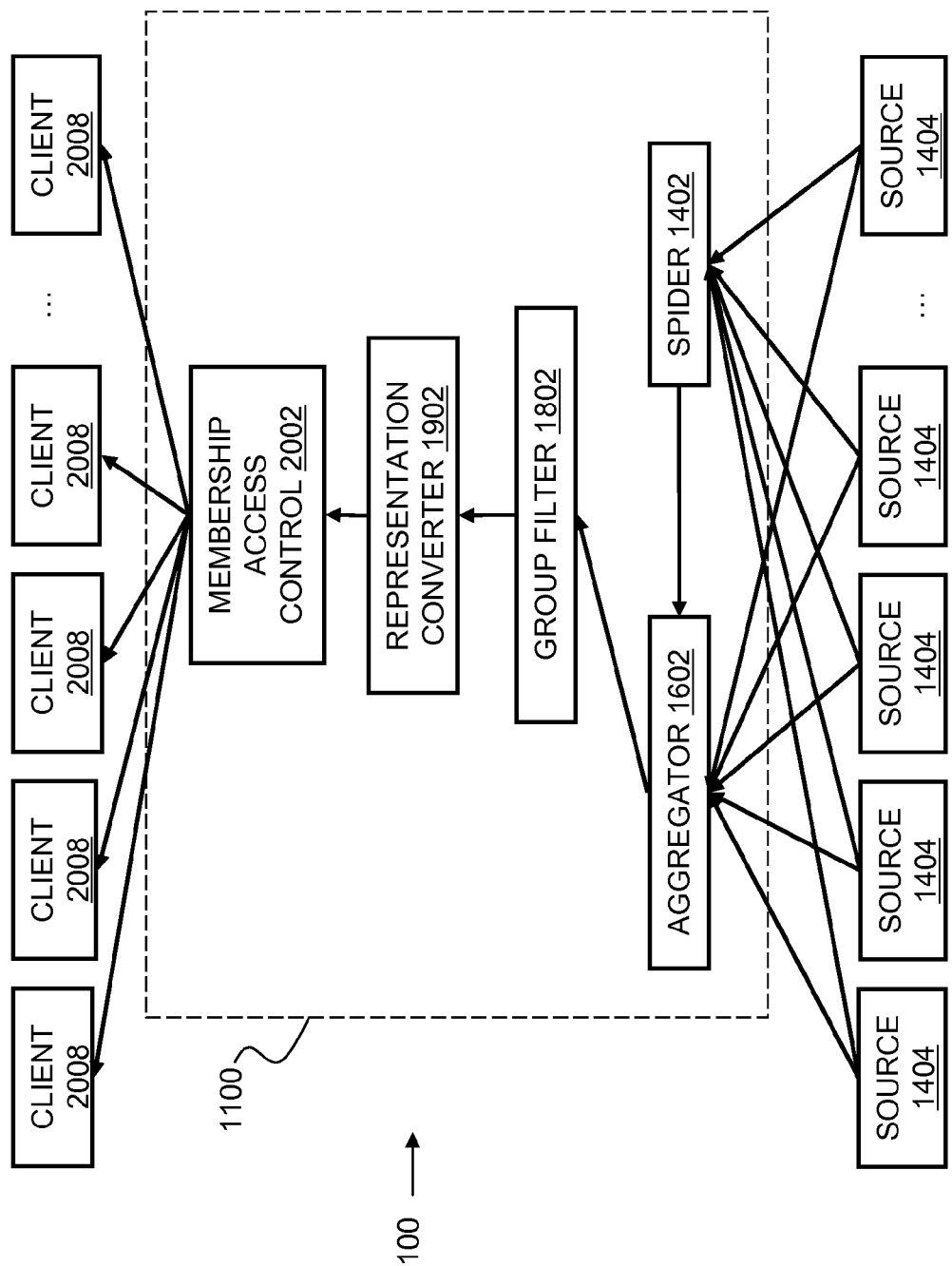
FIG. 11 depicts a complex processing operation.

FIG. 11 shows a composite service 1100 formed from other services. Referring to FIG. 11, a system 100 may include a plurality of sources 1404, a spider 1402, an aggregator 1602, a group filter 1802, a representation converter 1902, a membership control 2002, and a plurality of clients 2008. Functionally, this arrangement may search (through the spider 1402) and aggregate content from the sources 1404, filter the results, and convert the filtered results into a suitable representation, which may include media conversion and/or arrangement into an HTML or other format. The results may be restricted to specific clients 2008 using access control 2002. It will be understood that some or all of the services described above may be core services 110. At the same time, some or all of the services described above may be ad hoc services accessed through programming interfaces at third-party network locations. However at least one core service 110 or metaservice 120 will be employed to reconstitute the underlying services as a composite service 1100.

The clients 2008 may be computer programs under the control of a human, such as a feed reader in a browser that is being interactively operated by the human. The clients 2008 may be automatic computer programs, such as the service software modules 220 or any other software modules of the logical building block 108. The lines between the elements depict operative couplings between services. The arrowheads generally depict the flow of data and instructions, and imply a corresponding client-server coupling. Although this suggests a pull-based methodology (i.e. clients request then servers respond), it will be appreciated that other embodiments exist. For example, the elements may be configured as a collection of peers in a peer-to-peer configuration and/or may employ a push-based methodology (i.e., where servers transmit to clients without receiving explicit requests). All of these arrangements, and other configurations of the logical elements described herein, may fall within the scope of the present disclosure. More general, FIG. 11 serves as an example only, and in no way limits the scope of this disclosure. Further examples are provided below in narrative form.

As a more concrete and detailed example of how the core services 110 may be adapted to special purpose use, the elements described above may be deployed to provide an OPML server and database, with the core services 110 server, or another remote server, acting as a centralized access point. The OPML server may be configured for user manipulation of OPML content. The OPML server may provide services and content to clients 112 using, for example, a Web interface, an API, an XML processing interface, an RSS feed, an OPML renderer, and the like.

The OPML server may, for example, provide a search engine service to visitors. Output from the OPML server may be an OPML file. The file may, for example, be provided a name that explicitly contains the search query from which it was created, to facilitate redistribution, modification, recreation, synchronization, updating, and storage of the OPML file. A user may also manipulate the file, such as by adding or removing outline elements representing individual search results, or by reprioritizing or otherwise reorganizing the results, and the user may optionally store the revised search as a new OPML file. Thus in one aspect the OPML server creates new, original OPML content based upon user queries submitted thereto. In a sense, this function is analogous to the function of aggregators in an RSS syndication system, where new content may be dynamically created from a variety of different sources and republished in a structured form.

The OPML server may, more generally provide a front-end for an OPML database, which may operate from the database 111 of the core services 110 as described above, that stores OPML content. The OPML database may store OPML data in a number of forms, such as by casting the OPML structure into a corresponding relational database where each OPML file is encapsulated as one or more records. The OPML database may also store links to external OPML content, or may traverse OPML content through any number of layers and store data, files, and the like externally referenced in OPML documents. Thus for example, where an OPML file references an external OPML file, the external OPML file may be retrieved by the database 111 and parsed and stored. The external OPML file may, in turn, reference other external OPML files that may be similarly processed to construct, within the database 111, an entire OPML tree. The OPML database 111 may also, or instead, store OPML files as simple text, or in any number of formats optimized for searching (such as a number of well-known techniques used by large scale search engines Google, AltaVista, and the like), or for OPML processing, or for any other purpose(s). In a sense, the OPML database may provide the coherency for formation of an OPML network among an array of clients 112 and computing facilities 102, where content within the network is structured according to user-created OPML outlines.

The OPML database may, for example, operate through the OPML server to generate, monitor, and/or control spiders (deployed using, e.g., core services or ad hoc services) that locate OPML content. A spider may, upon identification of a valid OPML file, retrieve the file and process it into the database 111. A spider may also process an OPML file to identify external references, systematically traversing an entire OPML tree. A spider may be coordinated using known techniques to identify redundant references within a hierarchy. A spider may also differentiate processing according to, e.g., structure, content, location, file types, metadata, and the like. The user interface described below may also include one or more tools for configuring spiders, including a front end for generating initial queries, displaying results, and tagging results with any suitable metadata.

By way of example, and not of limitation, medical records may be stored as OPML files, either within the database 111, or in a distributed fashion among numerous locations across a network. Thus, for example, assorted X-ray data may be maintained in one location, MRI data in another location, patient biographical data in another location, and clinical notes in another location. This data may be entirely decoupled from individual patients (thus offering a degree of security and privacy), and may optionally include references to other content, such as directories of other types of data, directories of readers or interpretive metadata for understanding or viewing records, and the like. Separately, OPML files may be created to provide structure to the distributed data. For example, a CT scan OPML master record may index the locations of all CT scan records, which may be useful, for example, for studies or research relating to aggregated CT scan data. This type of horizontal structure may be captured in one or more OPML records which may, themselves be hierarchical. Thus, for example, one OPML file may identify participating hospitals by external reference to OPML records for those hospitals. Each hospital may provide a top-level OPML file that identifies OPML records that are available, which may in turn identify all CT scan records maintained at that hospital. The CT scan master record may traverse the individual hospital OPML records to provide a flattened list of CT scan records available in the system. As another example, an OPML file may identify medical data for a particular patient. This OPML file may traverse records of any number of different hospitals or other medical institutions, or may directly identify particular records where, for example, concerns about confidentiality cause institutions to strip any personally identifying data from records. For certain applications, it may be desirable to have a central registry of data so that records such as patient data are not inadvertently lost due to, for example, data migration within a particular hospital.

Thus in one embodiment there is generally disclosed herein a pull-based data management system in which atomic units of data are passively maintained at any number of network-accessible locations, while structure is imposed on the data through atomic units of relationship that may be arbitrarily defined through OPML or other grammars. The source data may be selectively pulled and organized according to user-defined OPML definitions. The OPML server and OPML database may enable such a system by providing a repository for organization and search of source data in the network 100. Operations (such as traversing OPML trees to fully scope an outline composed of a number of nested OPML outlines) may be performed by a client 112, or may be performed by the OPML server, either upon request from a client 112 for a particular outline, or continually in a manner that insures integrity of external reference links.

In another aspect, there is disclosed herein a link maintenance system for use in an OPML network. In general, a link maintenance system may function to insure integrity of external references contained within OPML files. Broken links, which may result for example from deletion or migration of source content, may be identified and addressed in a number of ways. For example, a search can be performed using the OPML server and OPML database for all OPML files including a reference to the missing target. Additionally, the OPML server and/or OPML database may include a registry of content sources including an e-mail contact for managers or administrators of outside sources. Notification of the broken link may be sent to all owners of content including a reference to the content. Optionally, the OPML server may automatically modify content to delete or replace the reference, assuming the OPML server has authorization to access such content. The OPML server may contact the owner of the missing content. The message to the owner may include a request to provide an alternative link, which may be forwarded to owners of all content that references the missing content. If the referenced subject matter has been fully indexed by the OPML server and/or OPML database, the content may be reconstructed, and a replacement link to the location of the reconstructed content provided. Various combinations of reconstruction and notification, such as those above, may be applied to maintain the integrity of links in OPML source files indexed in the database 111. In various embodiments the links may be continuously verified and updated, or the links may be updated only when an OPML document with a broken link is requested by a client 112 and processed or traversed by the client 112 or the OPML server in response.

The functionality of this OPML network, or more specifically, the medical OPML network, may be implemented using a combination of core services and metaservices. Thus as disclosed herein, the core services may be configured as a special purpose server, such as an OPML server and database, using pre-defined core services 110 and ad hoc services available as programming interfaces on a network.

Figure 12:
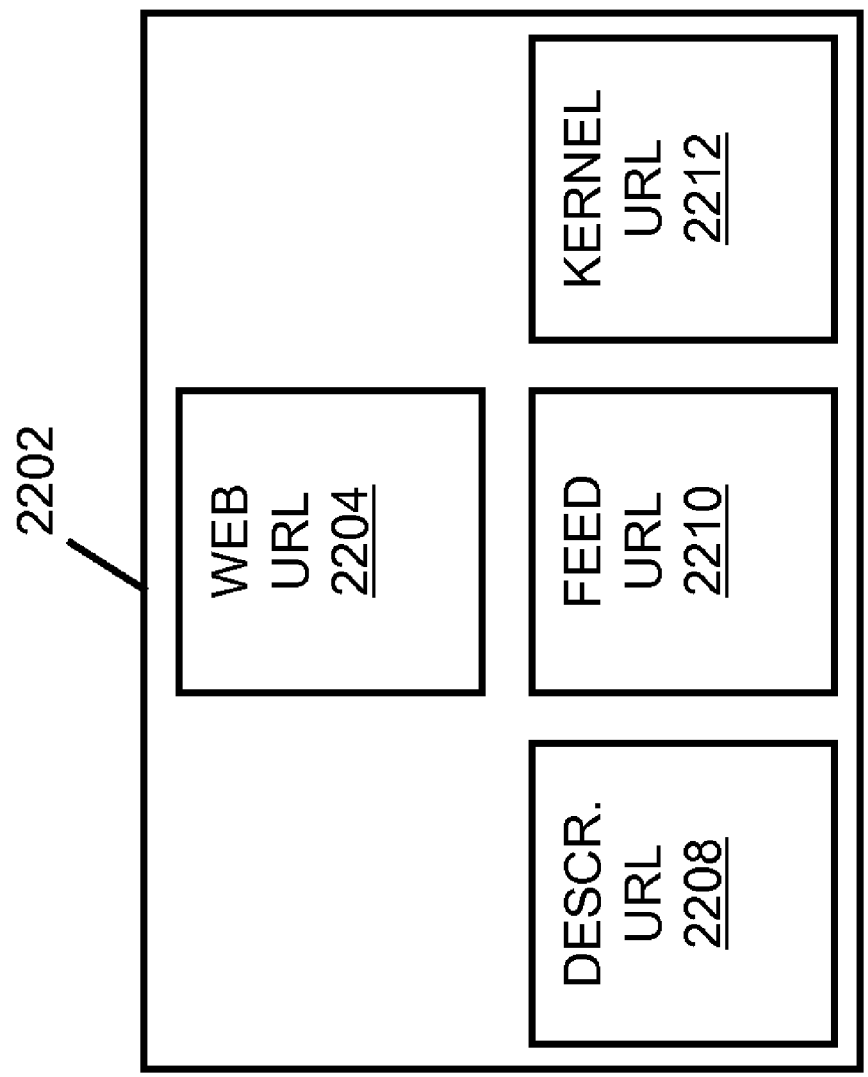
FIG. 12 depicts a high level programming interface.

Referring now to FIG. 12, an interface 2202 between logical building blocks 108 (alternatively referred to herein as functional elements, or simply elements) may include a Web URL 2204, a description URL 2208, a feed URL 2210, and a kernel URL 2212. This general format may be used for core services 110 and/or ad hoc services. As a significant advantage, ad hoc services conforming to this architecture by providing a description URL 2208 may be more readily discovered and exploited within the metaservices framework described herein.

The Web URL 2204 may provide an interface to a functional element using an HTTP server, which employs HTML-based representations of the services provided by the element. This optional interface may be employed to provide access to services of the element for a web-only client such as a traditional Web browser.

The description URL 2208 may refer to a location where a client puts or gets a description or configuration file for the interface to the element, including aspects such as formats or syntax for accessing functionality of the element, alternative locations for accessing the element, parameters that may be passed to the element, and interpretation of any result from the service, such as format, structure, return codes, and so forth. The configuration file may be represented as an OPML file, or using any other suitable format.

The feed URL 2210 may provide a location where a client can retrieve a feed-based representation of the objects provided by the functional element. Effectively, this provides an output or response from the service that is accessible using an HTTP Get to, for example, an RSS feed of results. In an embodiment, the feed-based representation is provided according to the RSS 2.0 format, but any suitable format, such as a variety of syndication or outlining formats, XML, plain text, or the like may be used.

The kernel URL 2212 provides a location where a client may access the services of the kernel, its aspects, and the service software components built thereon. In the preferred embodiment, the services are accessed via HTTP Get and HTTP Post, however any suitable protocol may be used. Through this URL, a client may access the services of a functional element, or other functional elements associated with that functional element. More generally, the kernel URL provides a general and adaptable interface through which a client can access any service that the logical block implements, or that that the logical block has access to. Conversely, the other URLs of the interface may provide static pathways to corresponding content.

While HTTP is one useful protocol for use with the systems described herein, other embodiments may be usefully employed. For example, a client may access the services at the kernel URL via the SMTP protocol. In this case, the services at the kernel URL may accept inputs and provide outputs in the form of SMTP e-mail messages. In embodiments, the logical building block may include a plurality of kernel URLs, each of which implements a different protocol. Thus, the logical building block may have an HTTP kernel URL and an SMTP kernel URL. Numerous other examples will be appreciated and are intended to fall within the scope of the present invention.

In embodiments, one element may provide a service that crawls or spiders an environment to generate a description file for the environment, or resources (e.g., other elements) available in the environment. In one aspect, the results may be stored in a database, and the element may present this as a searchable database of functional elements within the environment, such as by indexing the results according to elements of the description file. In another aspect, the element may configure itself to communicate with other elements according to their description files, and the element may further modify its own description file to reflect any new services or remote elements accessible therefrom. It will be appreciated that such an automatically configuring element or group of elements may take many forms. For example, the element may incorporate any identified methods so that they operate within the element. As another example, the element may present references to external or remote methods so that they may be located, but not directly accessed, through the description file of the element. Some embodiments may run in one computing facility, others may operate over a plurality of computing facilities. Some embodiments may automatically provide redundancy, failover, logging, and the like, either by default or optionally through an interface described within the description file.

In one embodiment, the interface 2202 of FIG. 12 may be used to provide the composite service 1100 described in reference to FIG. 11. In another embodiment, the interface 2202 may be used to provide the OPML server and database described above. In general, any composite service that can be created using the core services 110, metaservices 120, and ad hoc services described above may be provided as a network-accessible service using the interface 2202 of FIG. 12.

In one aspect, the architecture described above may be employed to provide an interface, such as an HTTP-based, put/get interface for a variety of syndication, outlining, and related functions. In embodiments, aspects of such a system may be presented to an application developer in the form of an Application Programming Interface ("API"). This API may include software interfaces allowing an application developer to access one or more syndication services within an operational kernel or description file of a server. This may include, without limitation, syndication services such as create, publish, and/or subscribe; semantic services such as outlining, listing, adding, deleting, tagging, labeling, analyzing, filtering, sorting, and the like; database functions such as read, write, search, retrieve, and the like; security services such as encryption, decryption, authentication, access, and the like; infrastructure services such as traffic management, routing, redundancy, logging, and so forth; and any other services that might be usefully employed within an enhanced syndication context as described herein and in the documents incorporated herein by reference.

An application developer may use the API to develop an application that uses one or more of the syndication services and any other services in the enhanced syndication environment, as well as any number of ad hoc services available on a network. The syndication services may be implemented in an operating system, in a database management system, in a user-level process on a client, in a user-level process on a server, as a Web service, and so forth. While in one aspect, the API presented by a server may operate exclusively using on protocol (or combination of protocols), it will be understood that the API may access other services that communicate using a variety of different protocols or communications media, including ad hoc services available through programming interfaces on remote sites. For example, one service may have an API implemented in a user-level process on a client, and the interface between the application and the user-level process may be a socket through which one or more messages may be passed. As another example, one API may be implemented as a Web service, where the interface between a user (which may be another service) and the Web service is an HTTP session over which one or more messages may be passed via SOAP. The application programming interface may employ a TCP/IP socket over which remote procedure calls are passed. The API may be implemented in a database management system. The interface between the application and the user-level process may include XQUERY messages. Alternatively, the database management system may include an integral implementation of the API, which may without limitation be accessed as a Web service. Thus, a simple interface employing HTTP-based gets and puts may expose a variety of services within a networked environment in a manner transparent to a user. Further, this interface may be extended to provide access to services using other programming interfaces.

It will be appreciated that this approach to deploying and integrating services and functions offers significant advantages. The use of HTTP-based gets and puts offers effectively universal accessibility, while URL's offer a commonly accepted platform for addressing elements of an (extensible) API. Similarly, the description file may employ OPML or similar outlining structures for a standardized grammar for describing the interface. The result may be a highly distributed, multi-user environment of variably-structured services and functional blocks. The system may employ any degree of data typing, and accommodate an ever expanding collection of cooperating elements which may be recursive, self-referential, and recombinant. The collective system may perform a wide variety of syndication-related, as well as non-syndication-related, functions at varying degrees of complexity. Thus, for example, an interface of an element may combine, index, access, move, convert, filter, or otherwise manipulate content. In addition, the interface may be employed to trigger other operations from other building blocks, or to display or transmit data.

In one application, the platform above may support a semantic computer that offers a family of functions organized around processing of content available on a network. This semantic computer may provide any number of core functions for processing, and optionally may provide extensibility as described above for additional functions that are, for example, user-created and endorsed by a user community. For example, the semantic computer may include a programming interface that includes an interface for membership/sign-in, spider configuration and deployment, aggregation or storage of spider results, parsing, organizing (using, e.g., OPML), and output or display of results.

A programming interface for performing these functions may include the following core elements:

Get

| | |
|---|---|
| In: | A URL of an element, object, pool, relation; zero or more constraints |
| Out: | The element, object, pool, relation, according to the constraints |
| Constraints: | "current," "in date range <start> <end>," "matches <keyword>," "index is <index>." |

Post

| | |
|---|---|
| In: | An element, object, pool, relation; a URL of a service |
| Actions: | Posts the input to the service at the URL |

Put

| | |
|---|---|
| In: | element, object, pool, or relation; a URL |
| Actions: | Puts the input at the URL |

Delete

| | |
|---|---|
| In: | A URL of an element, object, pool, or relation |
| Actions: | Deletes the thing at the URL |

GetIndexes

| | |
|---|---|
| In: | A URL of an element, object, pool, relation |
| Out: | The indexes of the thing at the URL |

PostIndex

| | |
|---|---|
| In: | An index; a URL of an element, object, pool, relation |
| Actions: | Posts the index to the thing at the URL |

PutIndex

| | |
|---|---|
| In: | An index; a URL |
| Actions: | Puts the input at the URL |

DeleteIndex

| | |
|---|---|
| In: | An index; a URL of an element, object, pool, or relation |
| Actions: | Deletes the index of thing at the URL |

The programming interface may also, or instead, include RSS-specific methods, such as:

ImportRSSFeed

| | |
|---|---|
| In | RSS Feed URL; import format (e.g. a schema, "HTML," etc.) |
| Out | The feed formatted according to the import format |

GetRSSFeedsByTag

| | |
|---|---|
| In: | A tag |
| Out: | All RSS feeds tagged with the tag |

The programming interface may also, or instead, include OPML-specific methods such as:

GetRelatedOPMLs

| | |
|---|---|
| In | URL of OPML file |
| Out | OPML of all related OPML files |

HostOPML*

| | |
|---|---|
| In | OPML, opmlname |
| Out | Hosted OPML URL |

HostOPMLFromURL*

| | |
|---|---|
| In | OPML URL, opmlname |
| Out | Hosted OPML URL |

TagOPML

| | |
|---|---|
| In | Hosted OPML URL, tag |

GetOPMLByTag

| | |
|---|---|
| In | tag |
| Out | All OPML tagged with the tag |

-continued

CreateUserAccount

| | |
|---|---|
| In | Username, Password |
| Out | Encrypted password key for username |

GetMyOPMLFiles

| | |
|---|---|
| In | Username/Encrypted password |
| Out | OPML file of all hosted OPML files for username |

GetMyOPMLFile

| | |
|---|---|
| In | Hosted OPML URL, encrypted password |
| Out | OPML |

ValidateOPML

| | |
|---|---|
| In | OPML |
| Out | Valid/Invalid |

Validate OPMLByURL

| | |
|---|---|
| In | OPML URL |
| Out | Valid/Invalid |

GetOPMLRSS

| | |
|---|---|
| In | OPML URL |
| Out | RSS of all posts of contained feeds |

ReadOPML

| | |
|---|---|
| In | OPML URL |
| Out | HTML of all posts of contained feeds |

IsOPMLContained

| | |
|---|---|
| In | Parent OPML URL, Child OPML URL |
| Out | True/False of if the parent contains the child |

IsOPMLRelated

| | |
|---|---|
| In | Parent OPML URL, Child OPML URL |
| Out | True/False of if the two URLs are related |

GetRelatedOPML

| | |
|---|---|
| In | OPML URL |
| Out | All OPML related to this one |

GetContainingOPML

| | |
|---|---|
| In | OPML URL |
| Out | OPML file of all parents of this OPML |

GetContainedOPML

| | |
|---|---|
| In | OPML URL |
| Out | OPML file of all descendents of this URL |

The programming interface may also, or instead, include OPML search methods such as:

GetHTMLOPMLKeywordSearch

| | |
|---|---|
| In | keywords |
| Out | HTML Outlines containing keywords in the text |

GetRSSOPMLKeywordSearch

| | |
|---|---|
| In | keywords |
| Out | RSS containing outlines containing keywords in their text |

GetOPMLKeywordSearch

| | |
|---|---|
| In | keywords |
| Out | OPML containing outlines containing keywords in their text |

GetOPMLPodcastSearch

| | |
|---|---|
| In | keywords, podcasts |
| Out | OPML with podcast feeds containing keyword(s) in their text |

GetOPMLRSSSearch

| | |
|---|---|
| In | keywords, rss |
| Out | OPML with RSS feeds containing keyword(s) in their text |

GetOPMLOPMLSearch

| | |
|---|---|
| In | keywords, opml |
| Out | OPML containing OPML outlines that contain keywords(s) in their text |

GetCategoryByKeyword

| | |
|---|---|
| In | keyword, category |
| Out | OPML of outlines containing keywords in their text that are not tree nodes |

OPMLSearchFilterByURL

| | |
|---|---|
| In | keyword, URL term |
| Out | all the above results filtered to only show URLs containing the URL term |

SearchOPMLByAttribute

| | |
|---|---|
| In | attribute name, keyword |
| Out | return OPML of all OPML files containing the keyword in the value of attribute passed |

It will be understood that the above methods are representative only, and that variations of the above methods may be suitably employed, including removal from or addition to the methods identified above. All such variations are intended to fall within the scope of this disclosure.

Thus, it will be appreciated that one general aspect of a system described herein includes a plurality of atomic functions for manipulation of OPML including search, presentation, navigation, publication, syndication, and so forth. These atomic functions may be exposed as individual services, as described generally above, or integrated into an OPML system, with a customized, web-based (or other) user interface for structured access to and use of OPML data. It will similarly be appreciated that the functionality described herein may be encapsulated in hardware such as a network server, a client computer, an integrated circuit, or a chip set.

A more generalized example of a useful arrangement of atomic functions for an OPML-based system is described below. In this example, atomic functions (or groupings of functions into atomic tool sets) are arranged around OPML creation, OPML validation, OPML publication, OPML search, OPML browsing, OPML reading, and subscription, which may be deployed using the architecture described above, or may form a set of core services 110 for an OPML-based metaservices system. These functions/groupings are discussed in greater detail below.

OPML creation: An OPML editor may be provided for creating and editing OPML files. An OPML manager may be provided for managing collections of OPML content distributed across multiple files. OPML creation tools may include, for example, tools for migrating content into and out of OPML format, as well as reader/browser type tools for viewing OPML content. These OPML functions may be encapsulated in a functional module accessible to end users separately, or within an integrated OPML environment.

Publication/Validation: OPML content may be published at an OPML site, or directly from a client device. Publication may be in native OPML format, and/or may be suitably formatted and handled for syndication. For syndication purposes, a publication source may independently configure its own polling frequency or else use a remote, hosted ping API to notify other locations of content updates. The ping interface may be an XML-RPC standard API. A corresponding spider for related search and indexing may, for example, employ robots.txt conventions to flag content in the root domain of a source. The source URL may be identified to never be auto-polled at a user's discretion. Auto-polling may occur at any suitable regular or irregular frequency, such as every 24 hours. Another tool that may be combined with publication tools or provided separately may validate OPML content for proper format, etc. These OPML functions may be encapsulated in a functional module accessible to end users separately, or within an integrated OPML environment.

Search: An OPML search engine may provide search capability across published OPML using, for example, the OPML search API's described above. A user may specify, for example, RSS, OPML, Podcasts, Categories, or the like. Once a user locates these types, the user may, through the interface, render the search results, as indicated in the interface with hyperlinks such as Read, Listen, View RSS feeds (this is so that you can preview a feed before you subscribe to it), and so forth. A user may also navigate to the OPML outline and content, such as using an OPML browser or an OPML reader. In addition, OPML files can be bookmarked within the interface to permit a user to return to bookmarked pages. These OPML functions may be encapsulated in a functional module independently accessible to end users, or within an integrated OPML environment.

Browse/Read: A browser interface and functionality may be provided for OPML files and content. In the browser, a user may navigate up and down a hierarchy of interrelated OPML content, and render leaf nodes containing, e.g., text, audio, video, and the like. Rendering engines may be provided for various media types. A user may also, or instead, directly read an OPML file, and navigate between OPML files through embedded references, using, for example, a client-side or server-side OPML renderer. These OPML functions may be encapsulated in a functional module independently accessible to end users, or within an integrated OPML environment.

Subscription: A subscribe feature may allow a user to select a default reader for OPML search results. Subscription to a feed of RSS or other content identified in an OPML file may be encapsulated within that interface as a one-click operation with, e.g., a hyperlink or icon. OPML source files may also, or instead, by subscribed to through a one-click operation. These OPML functions may be encapsulated in a functional module independently accessible to end users, or within an integrated OPML environment. Reading lists may also be integrated into an OPML system. Reading lists may be OPML documents that point to RSS feeds. Rather than a typical RSS subscription, however, a reader or aggregator may subscribe directly to an OPML Reading list (or other document) itself. When the author of the OPML document adds a feed, the aggregator may automatically check that feed in its next scan, and when a feed is removed, the aggregator may stop checking that feed. The editor of an OPML file can thus update all subscribers by updating the OPML file. These OPML functions may be encapsulated in a functional module independently accessible to end users, or within an integrated OPML environment.

Each of these functions or functions sets, such as create, validate, publish, search, browse, and read may be deployed independently, e.g., as a web service, a client program, or a hosted service encapsulated within, e.g., a web page user interface or Application Interaction Interface. Each function or function set may, in certain embodiments, be accessed individually by end users, and groups of functions or function sets may be combined into an integrated interface for use by end users, either locally or hosted at a remote network location.

For example, the core services 110 and metaservices 120 may be adapted for use with medical records. A hospital directory may, for example, be constructed around OPML, with numerous data types and levels of hierarchy, all of which may be deployed in a conditional access environment for limited or controlled use of data and functions. The OPML metaservices system may be employed to permit custom interfaces for various users on top of the entire pool or environment of hospital data. This may include general information interfaces for the general public, patient interfaces with conditional access to records for a particular patient, physician interfaces with conditional access to data and functions (e.g., prescription ordering) for groups of patients under treatment by a physician, administrator interfaces with conditional access to financial and payment data, and so forth.

The integrated system may be deployed as a private machine with access controlled by the creator using, e.g. password access to functions, function sets, source content, or integrated interfaces. Similarly, an OPML chip or physical device may integrate the functions and function sets into hardware. In another aspect, functions and function sets may themselves be deployed in a social network, as generally described above with respect to web superservices.

In a more general aspect, the platform described above may support a single point of contact for fixed services, extensible services, and/or ad hoc services. This generalized platform may be used to deploy new composite services created from various sources. The platform may, for example, be used to deploy a large-scale public aggregator that provides access control, searching, filtering, and clustering of content, or to deploy the OPML server/database described above.

In another aspect, the platform may provide an integrated system for managing semantic reference networks that arise from community-based, interactive collaboration and communication on a network such as the Internet. The integrated system may include classification schemes for naturally occurring structures such as labels, links, keywords, and so forth. In addition, the system may support conditional access, instrumentation to provide metrics for traffic and usage, security, and any of the semantic functions or other functions described above.

The term "service" and related terminology is now discussed in some detail as it relates to the systems disclosed herein. The term "superservice" is used in Application Integration and Middleware rubric to describe services that provide an API as a common service that replaces or masks other existing APIs. More generally, superservices may be understood as atomic, possibly canonical services that are released in a scalable, efficient, globally available form for re-use, combination, and re-composition into other services in a manner that requires no special activity by a user other than calling the superservice. Common superservices have evolved from, for example, various special purpose software that implements CRM, SCM, B2B, and other internal operational applications. These products usually operate across two or more operating systems, transaction processing systems, database management systems, application servers, and/or networking layers. Examples include adapters for accessing ERP, CRM, or other third-party application packages. More generally, a superservice may be any highly scalable atomic function that can be exposed as a service. In one aspect, the system described herein provides a common platform and/or central point of contact for deploying new superservices formed from other services and superservices that exist as ad hoc, remote programming interfaces. Superservices are often recognized by decomposition of large, special-purpose software systems, or evolved by users who identify and address needs for services in a network environment, or may be derived from any other source. Superservices, along with other services and/or data or content sources, may be combined into composite services using, for example, a metaservice that provides a service for managing and combining services.

As used herein, the term "superservice" is intended to include the web superservices generally described above, as well as any other highly scalable, networked service that provides a front end for proprietary data and/or software such as enterprise systems. The term "metaservice" is intended to include a service for managing other services including for example storing, accessing, executing, testing, cataloging, indexing, discovering, searching, annotating, characterizing, combining, and/or publishing services and specifying interfaces therefore. The term "composite service", as used herein, is intended to refer to a combination of services. As used herein, the term "service" is intended to more generally include any network-available service, including but not limited to the superservice, metaservice, and composite services described above, along with any other resource that might be cast as a service and made available through a network such as web services, search engines, mapping utilities, geolocation services, databases, dictionaries, RSS aggregators, spiders, and so forth, as well as mashups and other combinations of any of the foregoing.

Thus while a metaservice may be employed to arrange ad hoc services and core services into a specific application, such as an OPML database and/or server, the metaservice may more generally be used to provide any services such as web services, ad hoc services, superservices, composite services (combinations of superservices and/or other services, released as a new service) and/or metaservices (services for managing services, superservices, and/or composite services), thus enabling fully customizable, user-specified web services that combine any network-connected content and/or services. Thus any service, such as a front end for a database, may be combined with any other service, such as a mapping system with an API, to provide unique user services. A server built from the core services 110 and database 111 may provide a metaservice for organizing and combining these services, and sharing new, composite services with others.

This type of services composition can be observed in mashups, including popular combinations of mapping and other information services currently available on the web. Consistent with this trend, many entities are releasing increasingly low level interfaces to web services, such as Google's maps, or eBay's auction site. However, mashups remain a fully custom, one-off technique for creating composite services from these low level interfaces. It will be appreciated that any number of useful combinations of these and other third party services may be created using the metaservices described herein. This may include combinations of any of the following services that are present on the World Wide Web, as well as any other services amenable to structured access: mapping, auctions, telephone directories, patent databases, Edgar/SEC corporate filings, online want-ads (such as Craigslist), search engines, location services for cellular phones, services directories (restaurants, hotels, museums, etc.), RSS syndicated content, news feeds, stock quotes, sports scores, dictionaries, real estate listings, electronic commerce, legal databases (statutes and case law), multi-player games, IRC/online chat, and instant messaging. This may also, or instead, include new (typically commercial) services which may be increasingly decomposed and liberated for use by the public, such as: ticket sales, reservation systems, equities trading, supply chain management, customer ordering, customer relationship management, inventory management, financial reconciliation, tax preparation, and human resources. This may also include new superservices emerging on the web. Virtually any service that is maintained within an enterprise or otherwise provided by computers may be decoupled from its environment and offered as a stand-alone superservice for combination with other services on the Internet. Interfaces to such services may be through scripting or other programmatic access to URLs or URIs with command line interfaces, RSS, OPML, XML, APIs (including SOAP), and/or any other input/output mechanisms through which such services may be rendered.

As described generally above, the metaservices 120 or core services 110 may provide for metering of access to services that are commercially available so that these services can be incorporated into a composite service on a pay-as-you-go basis. The core services 110 may also provide reports on usage, and may support automated or manual payment for usage of such commercial services.

In one aspect, there is disclosed herein a metaservice system for locating, manipulating, combining, and publishing services, web services, superservices, and/or content sources. Thus the OPML server, for example, may also function as a service server or metaservice platform through which individual, decomposed services are located, registered, and made available alone or in combination with other services through a server such as the server hosting the core services 110. A user interface may be provided for searching for services (or searching an index of services), for selecting and combining services, and for manually or automatically generating scripts or other portable instantiations of composite services which may be published, such as through the core services 110, for use by clients 112 connected to a network. In another aspect, the core services 110 and database 111 may operate as a search engine for location of services, superservices, composite services, or other metaservice servers. It will be noted that through a metaservice, composite services may themselves be created and syndicated, i.e., published for subscription and use by third parties.

In a social aspect, users of the core services 110 may communicate with one another and share various services, superservices, and combinations of services, which may, in turn, be layered into additional composite services. Additionally, the community of users may identify new services that are needed, which may be contributed by community members, or constructed from existing services. Thus, in an alternative embodiment to structuring content through the use of OPML outlines, the core services 110 may provide a metaservice platform for structuring services that combine services and/or other superservices for use through a network. Similarly, decomposed services may be canonically arranged and registered or stored within the database 111. The tools for supporting this type of social networking may be provided as the core services 110 or metaservices 120 described above, such as through the social network methods 810 of the application-aspect interface 802 thereof.

In another aspect, an interface provided by the metaservice platform may provide for user submissions of new services, and may provide a sandbox for testing new services, superservices, and composite services. The testing may ensure, for example, end-to-end integration and/or compatibility across various platform, hardware, and/or software. Thus, for example, the validation may ensure timeliness of updates or information, compatibility with known web browsers, responsiveness of remote application programming interfaces, or compatibility with certain hardware for uploads (e.g., iPods, BlackBerry e-mail devices, Treos, cellular phones, etc.). The metaservice platform may also maintain a reference library of validated superservices meeting some performance criteria. Since the superservices themselves may have independent commercial value in such an environment, access to libraries of superservices may be fee based, using any number of known business models for electronic commerce or software licensing. These interfaces may provided, for example through the infrastructure-aspect interface 1302 and/or the program method 804 of the application aspect interface 802 described above.

Significant advantages may be realized from a structured, human-readable approach to creating and deploying composite services that aggregate a number of different services to achieve a new service. As an example, OPML may provide a useful structure for describing an interrelationship of services to achieve a new composite service. More generally, any XML-based, plain text based, command line oriented, or other syntax capable of capturing hierarchy, chronology, structure, and the like in an outline or other suitable format may be usefully employed.

As a general example, services may be arranged in an outline that describes the manner in which they are combined. For example:

```
<COMPOSITE SERVICE>
    Item 1
        Subitem a
            Sub-sub item (i)
    Item 2
        Subitem b
        Subitem c
</COMPOSITE SERVICE>
```

The outline, or more generally, the conceptual structure within the outline, may also be expressed implicitly as a sequence of terms made available within a URL/URI. For example, the composite service described above can be written as an extension of or substitute for a URL with an in-line syntax to delimit components. Using, for example, an ampersand, the above expression may be stated as <COMPOSITE SERVICE>&Item 1&Subitem a&Sub-sub item (i)&Item 2&Subitem b&Subitem c&</COMPOSITE SERVICE>. Similarly (and consistent with IETF RFC 1738), variables for local action by a browser may be demarcated by a '#' symbol.

Each element of the outline of a composite service may include a "name" and associated "value" or values. A name in this instance refers to a pre-defined variable and/or to a sub-action or sub-service that is to be invoked by that element. The value refers to but is not limited to a character, number, letter, word, term, list, array, cluster, object or any other kind of data element. The value may be inserted into the variable and/or used to condition the invocation of the action or service that is to be carried out by the element in the outline. The name and/or value may include elements of outlines, URI/URLs, and/or file names. For example, the name "search" might be associated with "General Electric" to invoke a search of a given data set for information related to General Electric Corporation. Additionally, name and value may be extracted from a file, a URL, and/or an element of text or other data stream, and this in turn may help condition the action or actions being invoked. For example, an image file or recorded music file or video file may have metadata encoded within the file itself, as is the case with ID3 data in music files.

A composite service may generate an outline as output from its action and/or as an output of any of its sub-actions. Outlines produced in this manner may in turn be used to invoke other services and to condition their action, and to direct the input of data into, and/or output of data from, the process or processes. Where none of the services provide persistence for this interim data, the data may be stored in the database 111 for the core services 110 (including, by way of example, as an RSS feed), or locally at a client device as discussed above. The data storage may be specified in the outline created, or may be specified along with the outline that specifies the composite service. In one aspect, services may each independently find a location to store interim data.

Each element of the outline of a composite service may refer to a specific service available on the network. The order may imply flow control for composition into a new service. Again referring to the example above, Item 1 may be performed by applying the results of Subitem a (which are in turn derived from Sub-sub item (i) to the service defined by Item 1. The output of Item 1 may be passed to the service defined by Item 2, which may receive an input that is the output of a sequential pre-processing by the services defined by Subitem b and Subitem c. In addition to sequencing, flow control may be provided with additional delimiters for, e.g., concatenation or combination of outputs, branching, looping, conditional statements, exit conditions, return codes, and the like. Each item may be further defined using any number of required or optional parameters. For example:

Item
   <service location>
   <input(s)>
   (e.g., source(s) or specific value(s), format, etc.)
   <service parameters>
   (specification of service(s))
   (any optional or required command parameters for the service(s))
   <output format>
   1. data typing
   2. output location
      a) another web service
      b) display (with, e.g., formatting/layout parameters)
      c) remote data site
      d) local machine folder
   3. file type
      a) audio
      b) video
      c) presentation document (Word, PowerPoint, etc.)

Where the service defined by the item is registered with a metaservice such as one of the metaservices described above, the parameters may be automatically reviewed, filtered, corrected, supplemented, or otherwise interpreted before invoking the service identified by the item. Thus a layer of intelligence may be provided by a metaservice for registered, or otherwise known or recognized services. Optionally, an unregistered service may be called blind, i.e., invoked by reference to a location with one or more strings of commands that are unconditionally passed to the identified location.

In one aspect, a composite service may take the form list/logic or attribute/value pairs. In a list/logic pair, the composite service grammar may specify locations or lists coupled with logic. A list could, for example, include a URL, a source, a folder, a file, HTML code, HTML permalinks, source code, and so forth. More generally, the list may be any data or content at any location. The logic may specify one or more operations to perform on the list, or optionally, a service to receive the list. The logic may further be parameterized according to any corresponding capabilities of the service or logical operation receiving the list. This may include switches, parameters, options, and the like such as are conventionally found in a command line syntax or the like.

The core services 110 or metaservices 120 described above may include a metaservices engine such as a parsing service for analyzing and processing composite services, whether expressed as list/logic pairs or any other suitable syntax or grammar. Thus for example, the metaservices 120 may include a service for parsing, choreographing, and executing a composite service, and for post-processing any results therefrom. This metaservices engine may be invoked directly by passing a suitably formatted outline, or may be invoked internally by a user interface provided by the core services 110 (or metaservices 120), or some combination of these. In embodiments, a browser or similar program at a client 112 may be locally configured to provide a human-usable interface for accessing the metaservices engine. This interface may be generalized, or may be specific to a certain task, service, or function.

In one aspect, a virtual machine may be formed by a master list of tasks for the core services 110. The master list may include a list of tasks or elements, each of which may contain actual logic (e.g., code of any form) or abstract functional descriptions, or references to external sources of the foregoing. The master list may organize and schedule tasks. Much as a computer program executing on a computer, the core services 110 may parse and execute (as appropriate) elements of the master list in programmatic fashion to achieve a design objective. Using the techniques described above, the core services 110 may call remote services that consist of nothing more than an application programming interface available through a network. The core services 110 may orchestrate presentation of a suitably formatted request to the programming interface and retrieval of any output from the service. Thus, widely distributed and unstructured data and services may be marshaled to one or more programmatic objectives of the core services 110, which may be hosted at a metaservices server that provides a central point of contact for accessing and managing network services. As a significant advantage, this general architecture may accommodate various distributions of data and processing, which may be optimized according to constraints such as data mobility or processing resources.

Other generalized computing concepts may be realized within the framework described above. Where a plurality of remote sites offer the same programming interface and services, the master list may employ parallelism and/or pipelining. Similarly, the master list may employ redundancy for important tasks. In various configurations, new tasks or logic may be expressed in the master list for execution, or deployed as a new service that can be invoked by a metaservices engine processing the master list. All such uses and variations are intended to fall within the scope of this disclosure.

In various embodiments, a composite service may execute locally on a client device that parses the structure of the master list, or the service may be created by a metaservice that orchestrates execution and provides any explicit or implicit flow control along with any required transient storage. Optionally, the metaservice may simply coordinate connections among the services without handling inputs and outputs except for a final result. Of course, this latter embodiment would require services that permit connections to be created among each other from a remote location, or otherwise provide for transient storage to support data persistence. A composite service may, for example, overlay or combine multiple outputs into a single, end-user display or data set.

Thus there is generally provided herein a programming language or syntax for creating, managing, invoking, searching, and syndicated composite services. The syntax may be expressed in OPML, or any other suitable grammar, and may provide for flow control, input/output management, parameterization of service calls, and the like for orchestration of a number of remote services into a composite service. The OPML (or other grammar) may be shared with others, who may use a particular composite service in combination with other services, or modify the composite service, or some combination of these. The composite service may be registered with a metaservice, or syndicated for third party use.

In another aspect, the metaservice may provide a forms-based system for creating composite services by providing a searchable database of registered services, along with forms that structure inputs, outputs, parameterization of service calls, and the like.

Unlike Universal Description, Discovery and Integration (UDDI), which relies on standardized protocols for a Web services registry, the systems described herein can accommodate registration as a technique to simplify user access to registered services, while permitting reference to arbitrary services regardless of their relationship to a metaservice or other registration site. Further, the systems described herein may permit a human-readable document to describe the interrelationship and flow control of a number of separate services. In particular, a syntax such as OPML, or OPML supplemented by a flow control syntax, may be used to embody a composite service of remote services. In addition, whether intended for local or remote execution, the composite service description itself may be shared through direct transfer or syndication using, for example, RSS or any other syndication techniques described herein.

The composite services, and techniques for creating same, as described herein may be used to deploy a wide array of new services. For example, using a Wireless Access Protocol for a portable device, a user may provide location information, status, and the like, which may be converted to an OPML output that may be made available to OPML search engines. A composite service may be configured, for example, to retrieve information for specific individuals (such as through a search or filter of location/status OPML files) and present location information on a map (such as through the Google Map API) along with a link or call out to status information. Optionally, the output or display of data may be configured to show multiple user locations, along with buttons to select individuals on a pick list for whom location may be displayed. Or, if the user information includes a group or affiliation, the output may also include a control to select a particular group for display within a map. Where location data is also syndicated, a data feed may be used to reconstruct not only a location, but a map showing changes in location over time, or a path taken by the located individual.

Composite services may be created for enhanced aggregator functions. For example, a composite service may be configured to render an outline of syndicated feeds by displaying the outline structure, and rendering within that outline groups of items from each feed (such as an RSS feed) identified.

Composite services may be created for managing multimedia content. For example, a composite service may be configured to search for podcast content within an OPML data structure, and render the content as a list of podcast items, along with an address of a location for the item. As another example, a composite service may be configured to identify podcast content, apply a filter (which may be a remote service or program logic within the composite service description) for suitable content, convert any responsive items into a single file format, and storing the converted items in a folder, which may be a remote storage folder or a folder on a user's local machine. A scheduler may re-execute the composite service either by prompting a user for a refresh or re-executing on a fixed timetable. As another example, the composite service described above may be applied to video content. The system may be extensible. For example, the description above mentions a filter, which would presumably be a filter for metadata associated with multimedia. However, an independent developer may develop a content filter that analyzes, e.g., audio content and creates a feature vector useful for measuring perceived similarity to other audio content. If the developer provides this functionality as a network-accessible programming interface, the content-based filter may be integrated into the podcast filter to identify, e.g., music that a user would probably like. As another example, a developer may create a technique for embedding media with a digital watermark that encodes data into the media. This may be employed to certify, identify, or log media as it is processed. This watermarking may be incorporated into any media processing through suitable incorporation of the corresponding remote, unstructured service.

Composite services may be used to prepare summary documents. For example, a spider or search engine may be applied to traverse an OPML tree structure, with results output to a file format such as PowerPoint, Word, or Excel. Parameters for such a service may include outline levels to be displayed, and an outline level at which pagination occurs (e.g., new page at each change in outline level 2).

Figure 13:
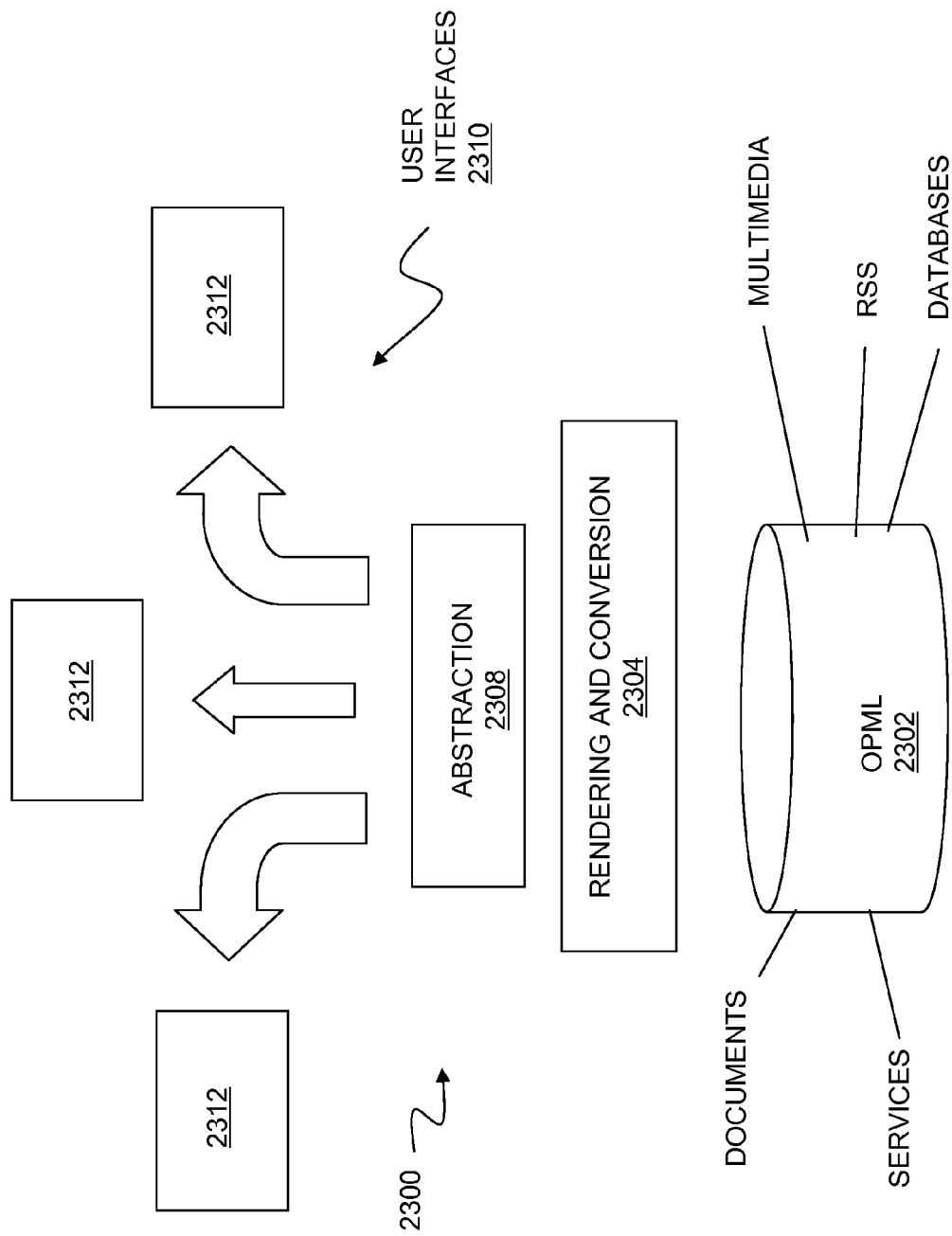
FIG. 13 shows an architecture for integrating and manipulating distributed data and services.

FIG. 13 shows an architecture for user interaction with various distributed content. In general, the architecture 2300 includes an OPML-based content collection 2302, a rendering and conversion system 2304, an abstraction layer 2308, and a number of user interfaces 2310 on client devices 2312. While generally depicted as a bottom-up process of rendering content and services on client devices, it should be understood that, consistent with this disclosure, the process may move from client devices 2312 to the collection 2302, such as where a client device 2312 publishes new content or creates and releases a new service. Similarly, while the description below focuses on obtaining customized client views of unstructured content and services, these new views may themselves form new services or content that can be published to the collection 2302 for use by others. In the following description, the term "content" is used generally to refer to data in any format, as well as services such as any of the services described above, and any other network-accessible, or potentially network-accessible resources.

The OPML-based content collection 2302 includes content of any type that might be organized into relationships using, for example, OPML. Other content may include documents (such as e-mail, calendar entries, spreadsheets, word processing documents, PDF, presentation documents (such as power point), and the like), services such as any of the services described above, multimedia (audio, video, animation, etc.), RSS or other syndicated formats, databases (including search engines) and any other electronic content, as well as additional OPML structures which may or may not be interrelated with one another. It will be appreciated that, while OPML is one convenient language for interrelating content into knowledge structures, any other suitable technologies may be employed such as other outlining languages, directory structures, relational databases, and so forth. More generally, the collection 2302 may be understood as a set of network-accessible content, along with an infrastructure for accessing and manipulating same. In one embodiment, this encompasses all content available on the Internet. In other embodiments, the content may be all content within an enterprise, or a subset of publicly available resources defined by access-control restrictions, individual preference, or the like.

The rendering and conversion system 2304 may be provided to accommodate the various content types available to the system. This may include rendering engines for various content using proprietary and open formats, as well as any number of conversion engines for converting content into a suitable form for end use. In addition, significant advantages may be realized by providing bi-directional converters for OPML (or any other language used to interrelate the content) so that knowledge structures may be readily ported into or out of the system. Thus, for example, an OPML structure may be converted into a power point presentation for purposes of communicating to others, or a Word document may be converted into an OPML outline. More generally, bi-directional converters may be usefully employed to enhance content (including services) creation options for client devices 2312. Suitable converters may be provided, for example, through the interpretation method 1108 of the semantic-aspect interface 1102, the media viewer method 808 of the application-aspect interface 802, the format-display method 904 of the client-aspect interface 902, or the data transformation method 1010 of the data-aspect interface 1002, or any combination of these appropriate for a particular conversion type.

The abstraction layer 2308 may be employed to translate content between its native, distributed format and a form suitable for interaction in a user interface (such as the interfaces described with reference to FIGS. 14 and 15 below). Thus for example, documents, services, multimedia and other content may be represented as icons or other user-operable objects that can be positioned within a user interface. OPML relationships may be converted to lines interconnecting such objects. Where the underlying content has associated metadata or properties, these may be presented within the object as buttons, drop-down menus, text, and so forth. Thus, for example, where a database object is presented through the abstraction layer, a table structure or a query interface may be presented directly within the object in a user interface, or in a manner accessible through the interface. Multimedia may be presented within a frame that includes controls such as volume, progress bar, forward, back, pause, color, and so forth. Services may be presented in an object that lists or provides access to API components.

In a navigation mode, a user interface 2310 may present content to a user in its abstracted form, with relationships shown within the interface 2310. The interface 2310 may enable management of the content by, for example, showing a certain number of layers within a hierarchy, and permitting a user to jump from node to node within a hierarchy. A user interface 2310 may also be preconfigured for certain types of data. For example, a health care information user interface might automatically provide a directory of hospitals, a topical map of high level categories, and a link to data restricted to access by treating physicians. The health care interface might also place conditional access controls at a top menu level for ready access, and may provide access to functional aspects of health care systems for suitably authorized users (for example, a prescription ordering system). By contrast, a general news interface might place filtering controls at a top level, along with an area for configuring paid content subscriptions. Each interface might default to specific OPML data sets or hierarchies. A user may also configure the interface according to personal preferences for rendering modes and tools that are provided within a menu hierarchy. In one aspect, the interface and elements thereof may be provided by the core services 110 and/or metaservices 120 described above.

In a manipulation mode, the user interface 2310 may permit a user to alter content. Thus for example, a new document may be added to the content by, for example, dragging and dropping an icon into the interface, associating the icon with a local document, and connecting the icon (within the interface) to an OPML structure or another document already in the interface. The resulting document and association(s) may then be automatically passed through the abstraction layer (uploaded), passed through any appropriate rendering/conversion steps, and placed into the content collection 2302.

Alternatively, an explicit publish command may be provided by the user. In a services example, a number of services within the network may be interconnected within the user interface to create a composite service as generally described above. The user interface may also include tools for validating and publishing such composite services. In another example, a database may be queried, with results passed to a service that outputs content which may be stored in a spreadsheet, which may be provided to a user through the user interface or republished into the OPML-based content. Any number of permutations are possible. Generally, the architecture provided herein contemplates access to and use of all such resources within a user interface which may be customized for various users and use types. Search engines, media converters, outlines, syndicated content, Web pages, and any other content, whether document-based or functional, may be viewed and manipulated.

Thus in one aspect there is provided herein a visualization tool for Internet content. The visualization tool provides a medium for viewing, manipulating, interrelating, and viewing relationships among various content. The tool may also provide configurable access to services. Views may be configured for different data types (e.g., health care, financial, news, sports, etc.), different professions (doctor, lawyer, accountant), and different data structures (e.g., OPML, structured databases, etc.). These views may be expressed as composite services that can be processed by a metaservice, and may be customized for individual use, and may be shared or published for third parties.

In another aspect, provided herein are visual design tools for manipulating web-accessible services.

In another aspect, provided herein is a design environment for functionally interconnecting web-based content.

In another aspect, provided herein is a visually oriented OPML manager providing tools for visualizing and manipulating OPML-based relationships and content.

In one embodiment, an additional functional layer may be added for post-processing content. In one implementation, data such as RSS data or other documents, may be processed to create organizational metadata such as an index, table of contents, list of figures/multimedia, bibliography, and the like, and this may be converted into an OPML structure that may be navigated using, e.g., the viewers described above. Thus in one aspect, disclosed herein is a system for automatic conversion of syndicated content or other data into OPML structures. The conversion may include searching, filtering, and clustering of syndicated content according to user parameters, as described generally, for example, in U.S. application Ser. No. 11/223,826 and the documents referred to therein.

Figure 14:
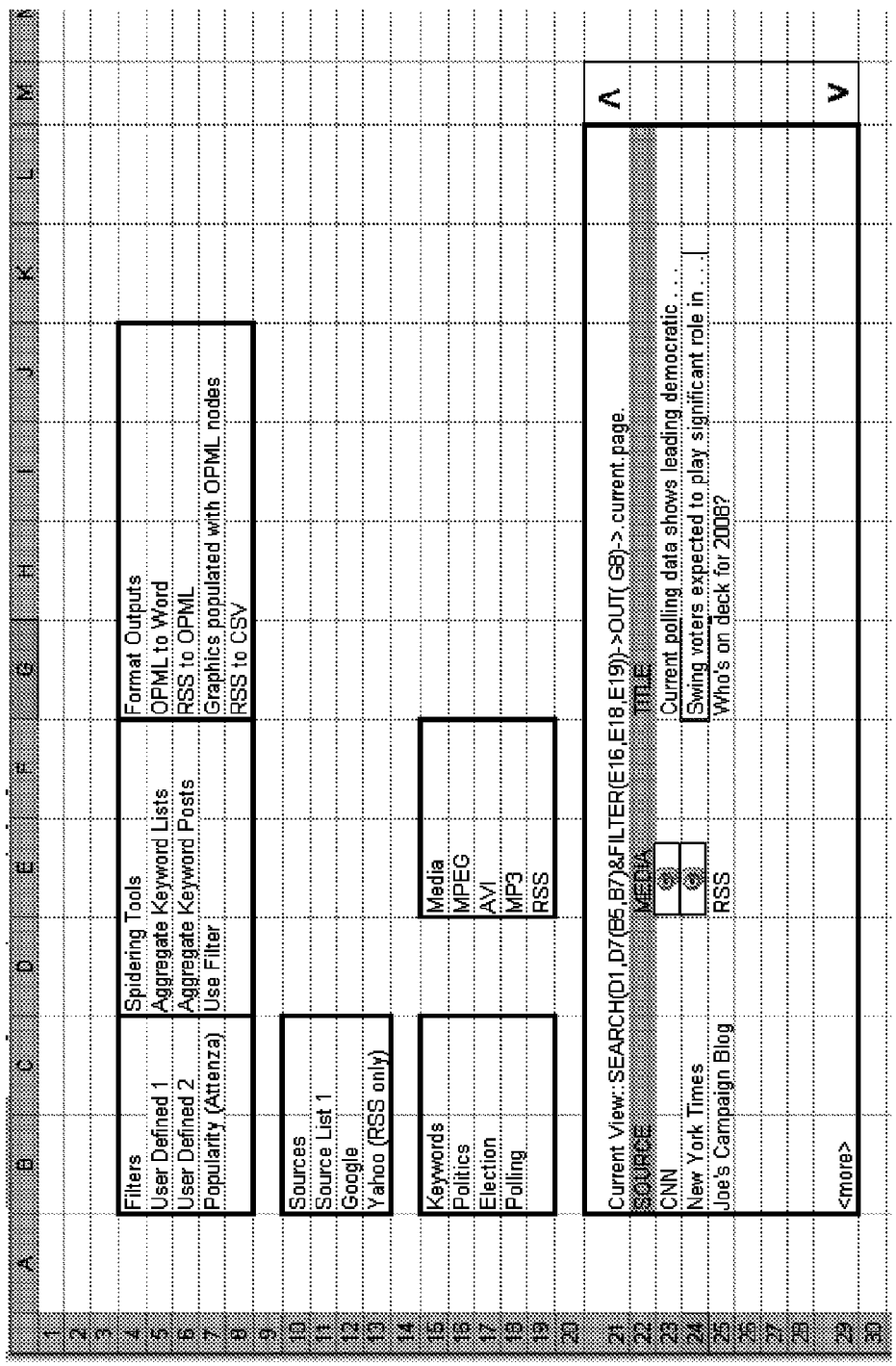
FIG. 14 shows a spreadsheet paradigm that may be used as a user interface for the navigation, management, and visualization tools described herein.

FIG. 14 shows a spreadsheet paradigm that may be used as a user interface 2400 for the navigation, management, and visualization tools described herein. It will be understood that the term spreadsheet, as used herein, refers to the visual organization of elements rather than functionality. At the same time, the spreadsheet interface 2400 may employ conventional spreadsheet nomenclature and operations to manipulate data and other items within the spreadsheet.

In the spreadsheet, a service such as a search may be parameterized using, e.g., values entered into cells of the spreadsheet. Cells may also, or instead, contain functional specifications, such as descriptions of Boolean operators, aggregation, filtering, output formats, conversions, mathematical operators, conditional statements, and so forth. These may be, for example written in a programming language specifically adapted for spreadsheet visualization, or using an existing programming language or syntax, by a creator of the spreadsheet or, they may contain interim or final results copied and pasted from other locations. In other embodiments, a cell may simply contain a reference to an external location where the desired service, function, parameter, or the like is present. Thus each cell may carry local content, or be defined with respect to other content. Similarly, each cell carries a global reference unique to the spreadsheet, so that it may be referenced from within the spreadsheet. These cells may also, or instead, be globally unique if the name of the spreadsheet can be uniquely identified within a global name hierarchy.

Thus, as depicted in FIG. 14, a user may create an area for filters within the spreadsheet. The top line of the filters area carries a title, which may or may not have functional significance within the spreadsheet. That is, the title line may simply carry text inserted by the user to denote the significance of additional content within a column, row, or, as depicted, a bordered box of cells. In other embodiments, the word "Filter" appearing in a column may indicate that related adjacent cells are filter descriptions having a certain predetermined syntax. Similarly, a user may populate cells with spidering tools, formatting tools, source lists, media types, keywords, or any other relevant parameters for a spreadsheet. For example, each cell within the spidering tools list may include a title that is visible within the spreadsheet, along with an associated specification for a spider which may either be executed locally or deployed as a service accessible at a defined network address. Thus the functionality of a particular spider may be abstracted to a title meaningful to the user. A user may, as another example, populate "format outputs" cells within various format conversions, which may, in turn be parameterized with exception handling, pagination, viewer capabilities, and so forth. Each cell may, for example, be parameterized with content from other cells, such as by using media types to parameterize a filter or spider, or by using an output type to parameterize the format for results.

In one aspect, a composite function may be formed from other functions within the spreadsheet. Thus, for example, a current view may be constructed by parameterizing a search and a filter operation, and sending the output to, in this case, a region within the current page, using an output format designated in another cell. An output format may, for example, designate a content conversion, an output format, and related parameters. For example, an RSS-to-CSV formatted output may specify that only a source, content hyperlink, and title are to be presented. Thus the output of a spreadsheet may be as depicted in FIG. 14—a list of relevant items, along with hyperlinks (including text and/or icons) to underlying content. This list may also be referenced by additional functions, such as a sorting function in another cell, which sorts according to some user-defined criteria and presents only the top five results. These results may also be used to populate a pre-defined region of the spreadsheet, or may be output to another medium such as an OPML document, a Word document or, where the content is multimedia content, to a portable device such as a cellular phone or iPod.

While a search is depicted, it will be appreciated that this methodology may be applied to any combination of services that combines databases, RSS feeds, OPML, web pages, web services, unstructured services, maps, API's, and any other resources that might be available on a network, such as the services described above, and may be used to specify complex, composite services within an intuitive user environment. Also, while the structure of the "Current View" is depicted as a command line, it will be appreciated that the structure may be graphically depicted using a flow chart, state diagram, or other process-oriented graphical language.

In addition, the view itself may be constructed within a graphical user interface using drag-and-drop components, each of which may be user-defined and/or user parameterized. One example of a suitable graphical user interface is described below with reference to FIG. 15.

Figure 15:
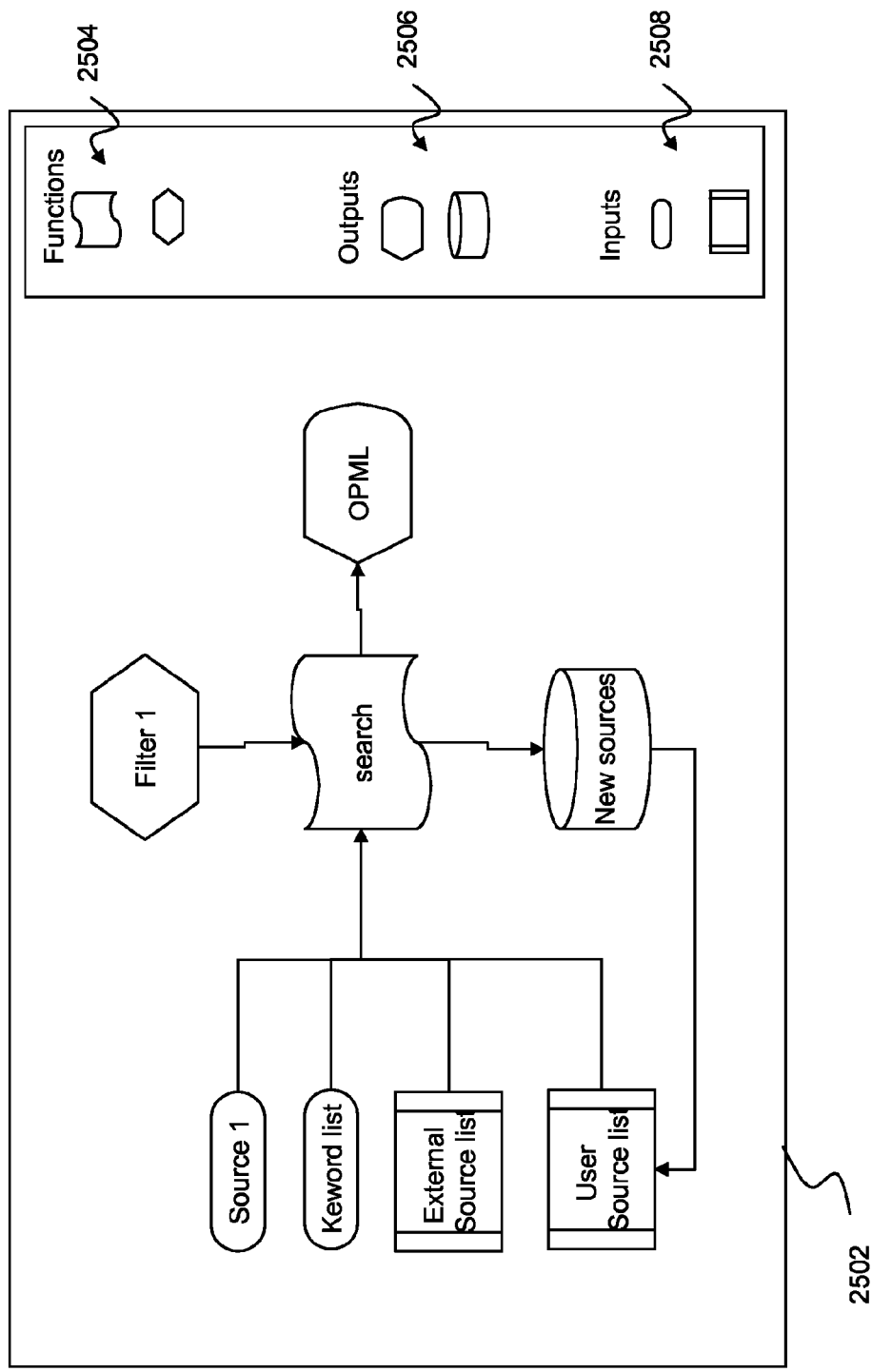
FIG. 15 shows a graphical user interface for managing services.

FIG. 15 depicts a user interface for a graphical environment for managing composite services as described herein. As depicted, the interface 2502 may provide drag-and-drop elements such as functions 2504 (which may include manually defined mathematical, Boolean, conditional, and/or flow related aspects, as well as references to external functions), inputs 2506 (which may include local data items, key-value or attribute-value pairs, lists, OPML, data sources (optionally with defined queries), and the like, as well as references to remote or external data) and outputs 2508 (which may include data formats, database commands, display types, document or media formats, device types, and the like, as well as addresses for output where an output file is created), all of which may be placed and interconnected by a user. Each object may be active, and may be activated such as by double clicking to invoke a menu, lists, command lines, or other elements that may be used to configure the selected item, such as providing data or pointers to local or remote data and/or services that might be used to form the composite service. In one aspect, the system may employ internal feedback, such as by supplementing a user-defined source list ("Source List 1") with additional sources identified during a search, or by supplementing the Keywords with highly correlated terms.

The interface may also provide operational data, such as the last time and/or date that the output was updated, or a most recent date for inputs or externally referenced functions (e.g., remote services). A refresh command may be provided to permit a manual refresh of output. In addition, a user may configure the service to refresh periodically. Where the composite service created within the interface 2502 is to be published, a user may also provide, through the interface 2502, a description of the syntax for invoking the service, such as the order and format of inputs. This description may be presented to external users through a variety of means, including without limitation the description URL described above. The interface 2502 may also provide a publication tool that permits the composite service, once designed and tested to the satisfaction of the author, to be published along with an automatically or manually generated API for accessing the composite service. In other embodiments, the publication tool may permit publication as a web application adapted for human use through a web browser or the like.

Thus, there is disclosed herein a graphical user interface for managing composite services. The interface may provide for creation, visualization, editing, and publication of composite services in web application or programming interface form. The interface may provide GUI access to any of the core services 110 or metaservices 120 described above, as well as other content and services, and may provide accompanying tools for validation and so forth.

It will be appreciated that the above processes, and steps thereof, may be realized in hardware, software, or any combination of these suitable for a particular application. The hardware may include a general purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across a camera system and/or a computer in a number of ways, or all of the functionality may be integrated into a dedicated, standalone device or other hardware. All such permutations and combinations are intended to fall within the scope of the present disclosure.

It will also be appreciated that means for performing the steps associated with the processes described above may include any of the hardware and/or software described above. In another aspect, each process, including individual process steps described above and combinations thereof, may be embodied in computer executable code that, when executing on one or more computing devices, performs the steps thereof.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A system for creating a composite service from a plurality of remote services, each relating to a plurality of healthcare system functional areas, the system comprising a network, a computer having a computer readable medium having stored thereon instructions which, when executed by a processor of the computer, causes the processor to perform the steps of:

coupling a database in a communicating relationship with the network, the database storing one or more characteristics of a plurality of remote RSS data feed services, each relating to a plurality of healthcare system functional areas, and configured to provide a differential level of access to a user, the level of access defined by a security level of said user that is based at least in part on the user having permitted access to a functional area of a healthcare system, each remote RSS data feed service hosted at a remote location on the network, and each remote RSS data feed service accessible through a client application programming interface that is configured to healthcare data and is associated with the database, the client application programming interface having a front end configured to initiate client specific interactions of the remote RSS data feed service, the one or more characteristics including at least a network location and a programming interface specification for each one of the plurality of remote RSS data feed services, the database including a web interface for structured searching of the one or more characteristics, and wherein the remote RSS data feed service stored in the database is accessed based on security permissions associated with the security level of said user;

associating a server with the database, said server providing at least one core RSS data feed service for creating a composite RSS data feed service from two or more of the plurality of remote RSS data feed services and expressing the composite RSS data feed service in an outlining grammar; and associating a second server with the database, said second server providing at least one RSS data feed metaservice, relating to at least one healthcare system functional area among the plurality of healthcare system functional areas, that is enabled to manage an infrastructure of core RSS data feed services and provide services for discovery, indexing, and documentation using a client device.

2. The system of claim 1 wherein the network includes the Internet.

3. The system of claim 1 wherein the network includes the World Wide Web.

4. The system of claim 1 wherein the network includes a network that interconnects the database with the Internet.

5. The system of claim 1 wherein at least one of the programming interface specifications specifies an RSS input.

6. The system of claim 1 wherein at least one of the programming interface specifications specifies an RSS output.

7. The system of claim 1 wherein the web interface includes a graphical user interface for interconnecting a plurality of the remote services in a composite service.

8. The system of claim 7 wherein the web interface provides a tool for storing one or more characteristics of the composite service in the database.

9. The system of claim 7 wherein the composite service is stored in the database for discovery through the web interface for structured searching.

10. The system of claim 1 further comprising a spider facility for discovering remote services on the network.

11. The system of claim 1 further comprising a spider facility that searches for remote services on the network.

12. The system of claim 1 wherein the network includes the Internet.

13. The system of claim 1 wherein the network includes the World Wide Web.

14. The system of claim 1 wherein at least one of the programming interface specifications specifies an RSS input.

15. The system of claim 1 wherein at least one of the programming interface specifications specifies an RSS output.

16. The system of claim 1 wherein the database is publicly accessible, the system further comprising at least one tool for creating a composite service from a plurality of the remote services, and for publishing the composite service in the database.

17. The system of claim 16 wherein the composite service is characterized using an outlining grammar.

18. The system of claim 17 wherein the outlining grammar is OPML.

* * * * *

UNITED STATES PATENT AND TRADEMARK OFFICE
CERTIFICATE OF CORRECTION

PATENT NO. : 8,316,005 B2
APPLICATION NO. : 11/608261
DATED : November 20, 2012
INVENTOR(S) : James F. Moore It is certified that error appears in the above-identified patent and that said Letters Patent is hereby corrected as shown below:

On the TITLE PAGE:
Under (73) Assignee delete "Newslike" and insert --Newsilike--;

Title Page 4:
Under OTHER PUBLICATIONS, left column, line 63, delete "comimricroldicomlindex.html" and insert --com/mricro/dicom/index.html--;
left column, line 67, delete "http://web.archive.orcilweb" and insert --http://web.archive.org/web--;
left column, line 72, delete "http://www.w3.org/Tr/rdf-" and insert --http://www.w3.org/TR/rdf--;

In the CLAIMS:
column 42, lines 8-16, delete claims 12-15.

Signed and Sealed this
Twenty-sixth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,316,005 B2 | Page 1 of 1 |
| APPLICATION NO. | : 11/608261 | |
| DATED | : November 20, 2012 | |
| INVENTOR(S) | : Moore | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this
Sixteenth Day of September, 2014

Michelle K. Lee
*Deputy Director of the United States Patent and Trademark Office*